United States Patent
Grabarnik et al.

(10) Patent No.: US 12,046,165 B2
(45) Date of Patent: Jul. 23, 2024

(54) OPTICAL SYSTEM INCLUDING SELECTIVELY ACTIVATABLE FACETS

(71) Applicant: LUMUS LTD., Ness Ziona (IL)

(72) Inventors: Shimon Grabarnik, Rehovot (IL); Tsion Eisenfeld, Ashkelon (IL); Elad Sharlin, Ness Ziona (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 18/349,362

(22) Filed: Jul. 10, 2023

(65) Prior Publication Data

US 2023/0351930 A1    Nov. 2, 2023

Related U.S. Application Data

(63) Continuation of application No. 17/667,044, filed on Feb. 8, 2022, now Pat. No. 11,741,861.

(51) Int. Cl.
*G02F 1/01* (2006.01)
*G09G 3/00* (2006.01)

(52) U.S. Cl.
CPC ............. *G09G 3/001* (2013.01); *G02F 1/011* (2013.01); *G02F 2201/06* (2013.01); *G02F 2203/01* (2013.01); *G02F 2203/02* (2013.01); *G09G 2320/0257* (2013.01); *G09G 2354/00* (2013.01); *G09G 2360/144* (2013.01)

(58) Field of Classification Search
CPC .. G02F 1/011; G02F 2201/06; G02F 2203/01; G02F 2203/02; G09G 3/001; G09G 2354/00
See application file for complete search history.

(56) References Cited

U.S. PATENT DOCUMENTS

| 10,466,479 B2 | 11/2019 | Shih et al. |
| 10,795,160 B1 | 10/2020 | Stanley et al. |

(Continued)

FOREIGN PATENT DOCUMENTS

| CN | 111308717 A | 6/2020 |
| WO | 2021040096 A1 | 3/2021 |

OTHER PUBLICATIONS

EP Search Report of European application 23151296.3 issued on Jun. 20, 2023.

(Continued)

*Primary Examiner* — Sanghyuk Park
(74) *Attorney, Agent, or Firm* — Scully, Scott, Murphy & Presser, P.C.

(57) ABSTRACT

In an embodiment, an apparatus is disclosed that includes at least one processor configured to determine a target portion of an eye motion box and to identify a facet of a light-guide optical element that is configured to direct a light beam comprising at least a portion of an image field of view toward the target portion of the eye motion box. The at least one processor is configured to identify a display region of an image generator that is configured to inject the light beam into the light-guide optical element at an angle that, in conjunction with the identified facet, is configured to direct the light beam toward the target portion of the eye motion box. The at least one processor is configured to selectively activate the identified facet and the identified display region to direct the light beam toward the target portion of the eye motion box.

15 Claims, 21 Drawing Sheets

(56) References Cited

U.S. PATENT DOCUMENTS

| | | | |
|---|---|---|---|
| 2012/0050142 A1* | 3/2012 | Border | G02B 27/0101 |
| | | | 345/8 |
| 2014/0036361 A1 | 2/2014 | Woodgate et al. | |
| 2014/0232651 A1 | 8/2014 | Kress et al. | |
| 2015/0178939 A1 | 6/2015 | Bradski et al. | |
| 2018/0284884 A1 | 10/2018 | Sulai et al. | |
| 2018/0335629 A1* | 11/2018 | Cheng | G02B 27/1006 |
| 2019/0187482 A1* | 6/2019 | Lanman | G02B 27/0179 |
| 2020/0292818 A1 | 9/2020 | Amitai et al. | |

OTHER PUBLICATIONS

EP Search Report of European application 23151296.3 issued on Nov. 10, 2023.
Korean Office Action issued on Feb. 2, 2024 for Korean Application 10-2023-0010177.

* cited by examiner

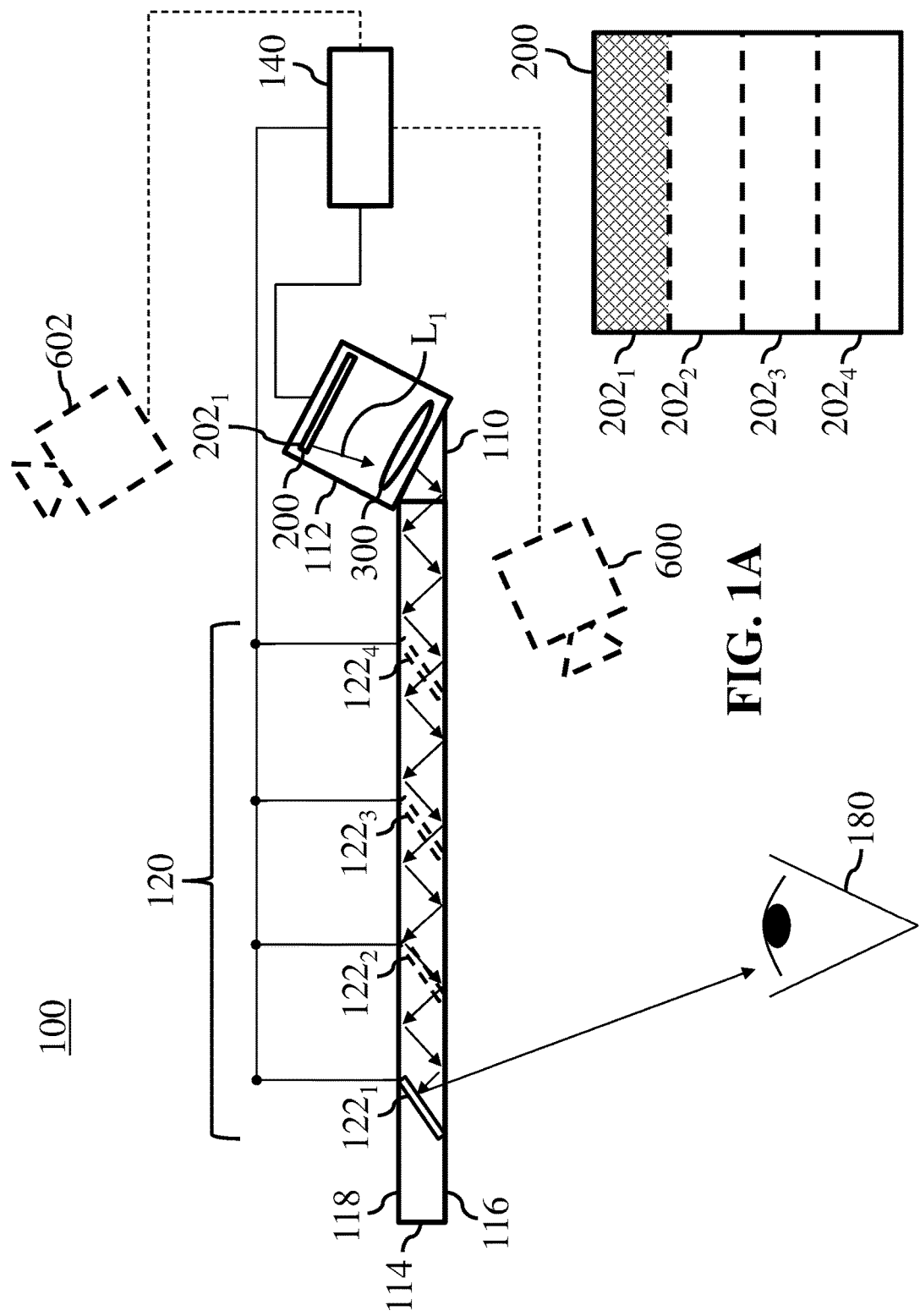

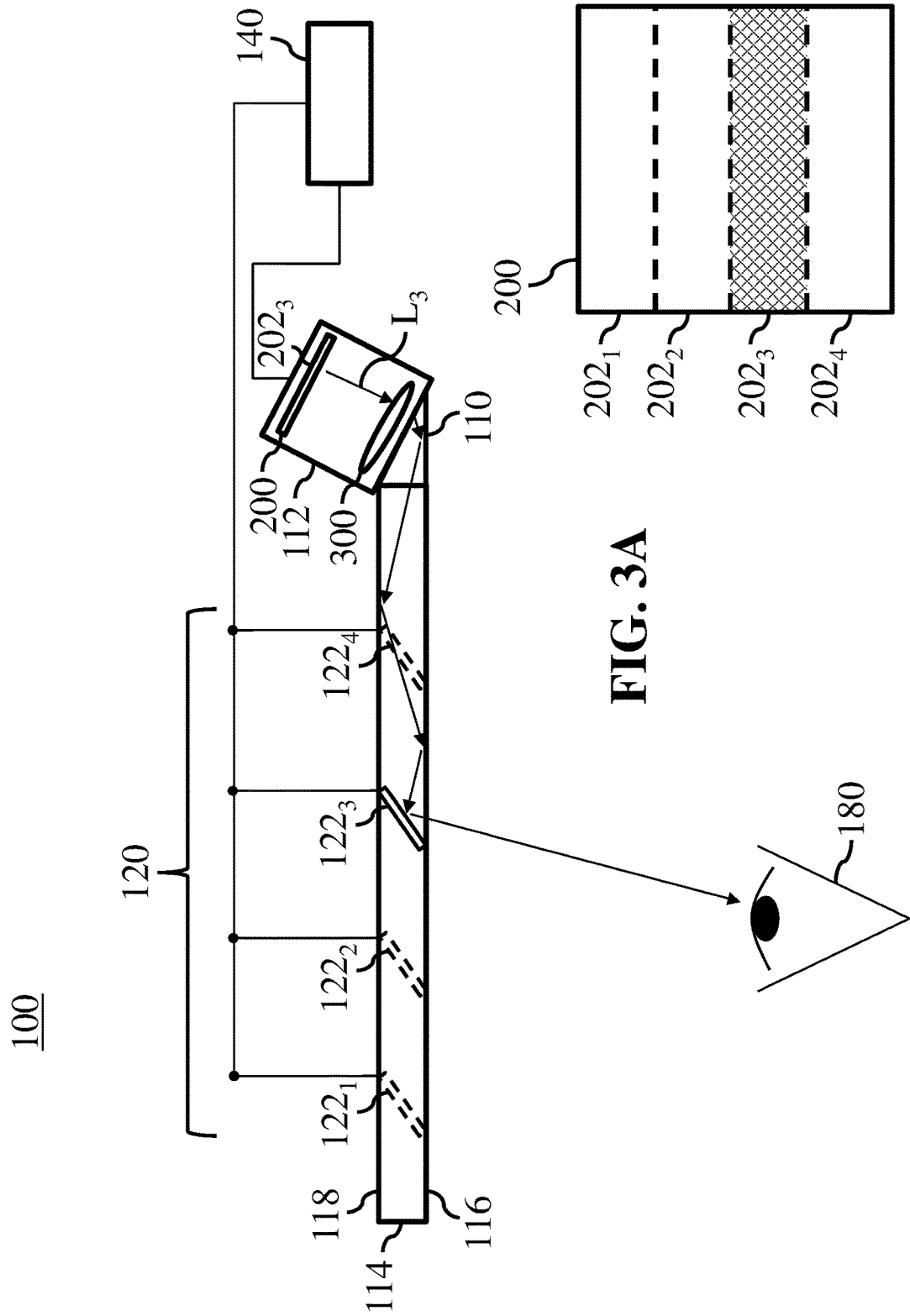

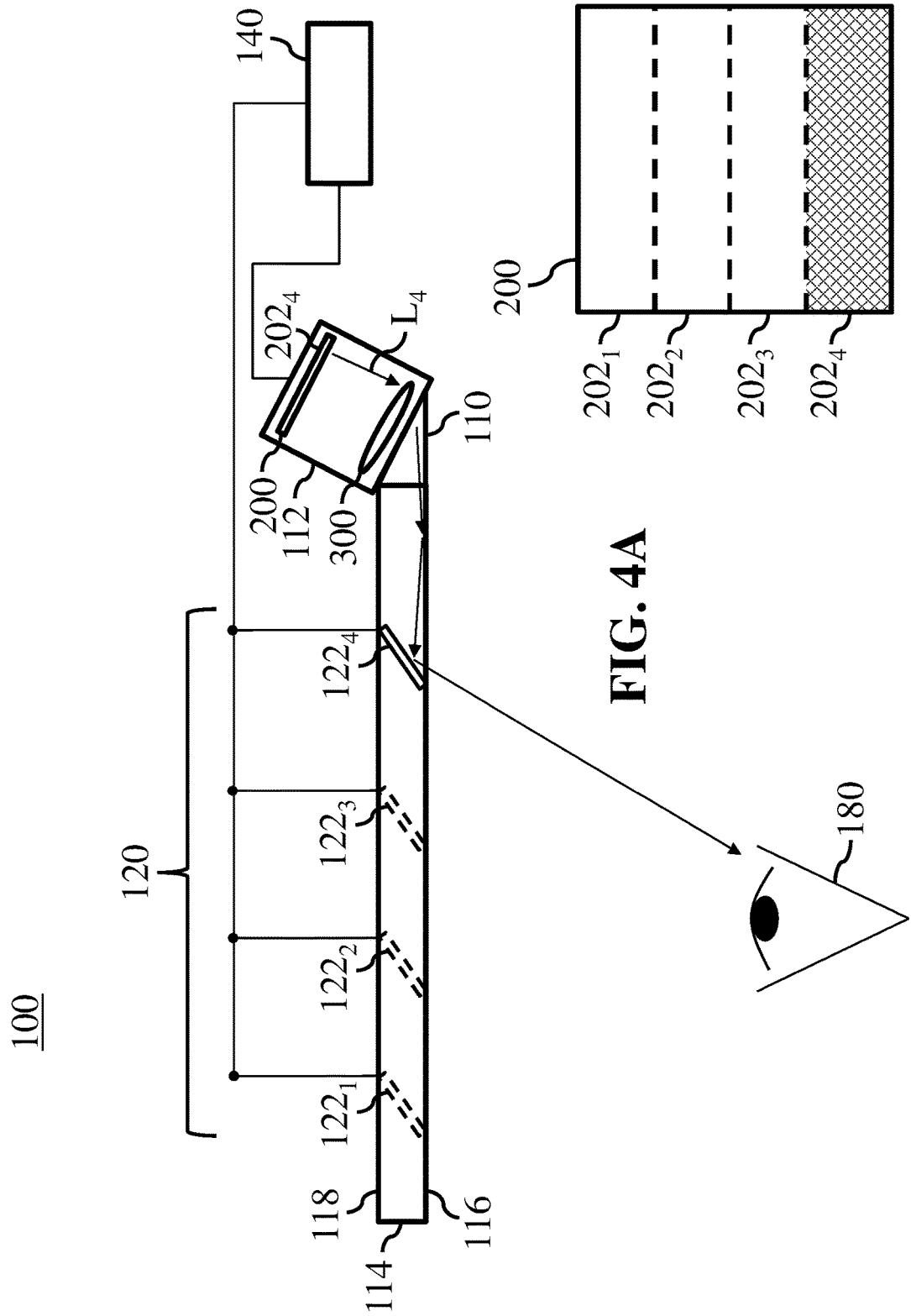

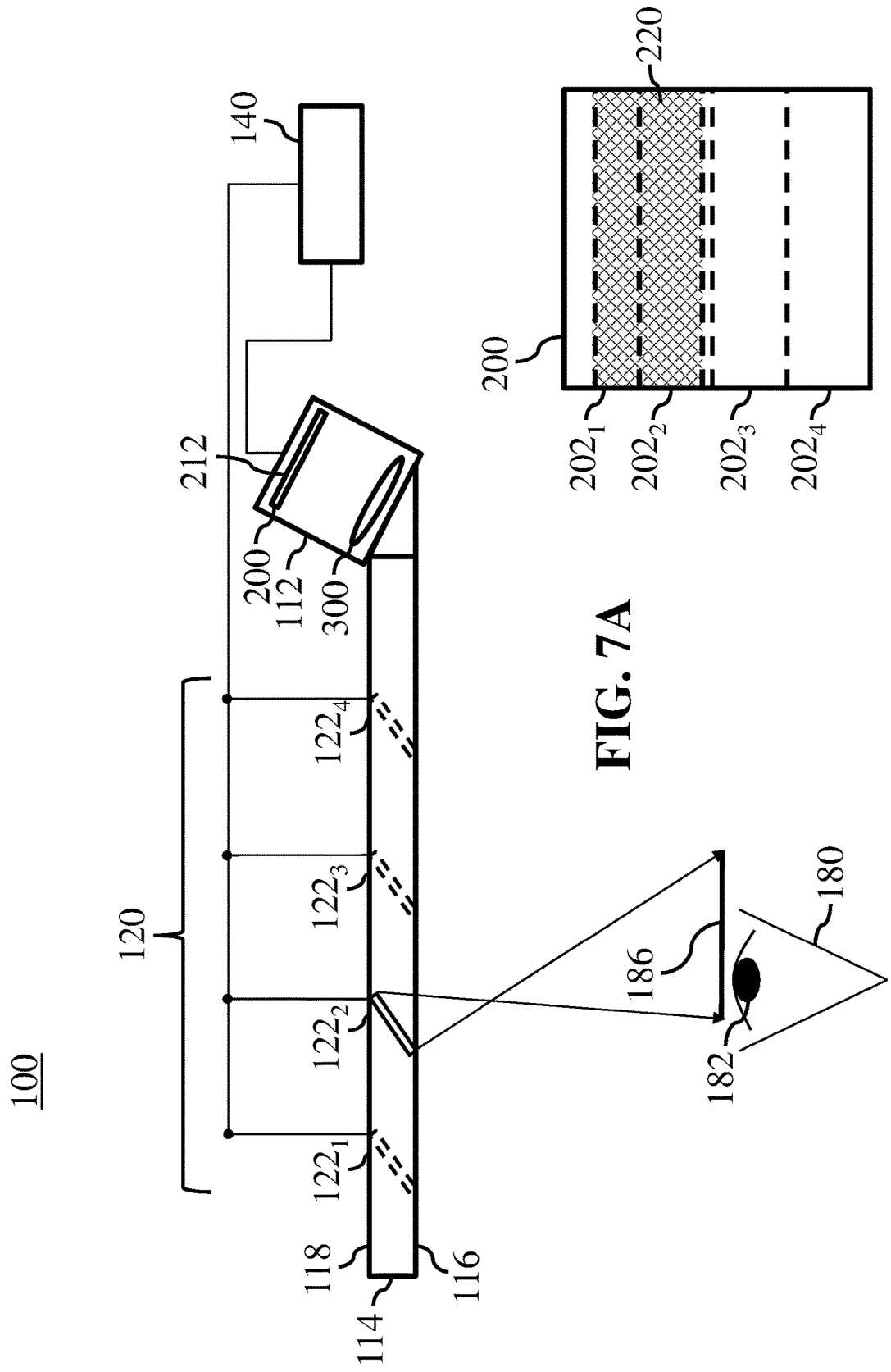

OPTICAL SYSTEM INCLUDING SELECTIVELY ACTIVATABLE FACETS

CROSS-REFERENCE TO RELATED APPLICATION

The present application is a continuation of U.S. patent application Ser. No. 17/667,044, filed on Feb. 8, 2022. The entire disclosure of U.S. patent application Ser. No. 17/667,044 is incorporated herein by reference.

BACKGROUND OF THE SPECIFICATION

The present disclosure relates to optical systems. More specifically, the present disclosure relates to optical systems having selectively activatable facets that may, in some embodiments, be used in near-eye display systems.

Optical systems such as near-eye display systems typically illuminate the eye of a user with an image. In some cases, an optical system may illuminate the entire eye or the entire pupil with a light beam of the image regardless of where the pupil is located. In some cases, external light may produce ghost images due to reflections by the optical system. However, illumination of the entire eye or the entire pupil may be inefficient and ghost images may be undesirable.

SUMMARY

In an embodiment, an apparatus is disclosed that comprises at least one processor. The at least one processor is configured to determine a target portion of an eye motion box and to identify a facet of a plurality of facets of a light-guide optical element. The identified facet is configured to direct a light beam comprising at least a portion of an image field of view toward the target portion of the eye motion box. The at least one processor is further configured to identify a display region of a plurality of display regions of an image generator. The identified display region is configured to inject the light beam into the light-guide optical element at an angle that, in conjunction with the identified facet, is configured to direct the light beam toward the target portion of the eye motion box. The at least one processor is further configured to selectively activate the identified facet and the identified display region to direct the light beam toward the target portion of the eye motion box.

In some embodiments, a method is disclosed comprising determining a target portion of an eye motion box and identifying a facet of a plurality of facets of a light-guide optical element. The identified facet is configured to direct a light beam comprising at least a portion of an image field of view toward the target portion of the eye motion box. The method further comprises identifying a display region of a plurality of display regions of an image generator. The identified display region is configured to inject the light beam into the light-guide optical element at an angle that, in conjunction with the identified facet, is configured to direct the light beam toward the target portion of the eye motion box. The method further comprises selectively activating the identified facet and the identified display region to direct the light beam toward the target portion of the eye motion box.

In an embodiment, an optical system is disclosed. The optical system comprises a light-guide optical element comprising a plurality of facets. Each facet is selectively activatable between at least a first state in which the facet is configured to allow a light beam to be transmitted therethrough and a second state in which the facet is configured to reflect the light beam. The facets are configured to direct light beams corresponding to an image field of view toward a target portion of an eye motion box when in the second state. The optical system further comprises an image generator comprising a plurality of display regions. The display regions are selectively activatable to inject light beams corresponding to the image field of view into the light-guide optical element at different angles. The optical system further comprises a controller that is configured to identify a facet of the plurality of facets. The identified facet is configured to direct a light beam comprising at least a portion of the image field of view toward the target portion of the eye motion box. The controller is further configured to identify a display region of the plurality of display regions. The identified display region is configured to inject the light beam comprising the at least a portion of the image field of view into the light-guide optical element at an angle that, in conjunction with the identified facet, is configured to direct the light beam toward the target portion of the eye motion box. The controller is further configured to selectively activate the identified facet and the identified display region to direct the light beam toward the target portion of the eye motion box.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 1A is a schematic diagram of an example optical system with a first facet activated according to an embodiment.

FIG. 1B is a schematic diagram of an example image generator of the optical system of FIG. 1A with a first display region activated according to an embodiment.

FIG. 3A is a schematic diagram of the optical system of FIG. 1A with a third facet activated according to an embodiment.

FIG. 3B is a schematic diagram of the example image generator of FIG. 1B with a third display region activated according to an embodiment.

FIG. 4A is a schematic diagram of the optical system of FIG. 1A with a fourth facet activated according to an embodiment.

FIG. 4B is a schematic diagram of the example image generator of FIG. 1B with a fourth display region activated according to an embodiment.

FIGS. 7A and 7B are schematic diagrams of the optical system of FIGS. 1A and 1B illustrating the direction of light beams onto an eye without the use of an eye tracking system according to an embodiment.

DETAILED DESCRIPTION

Figures 2A, 2B:
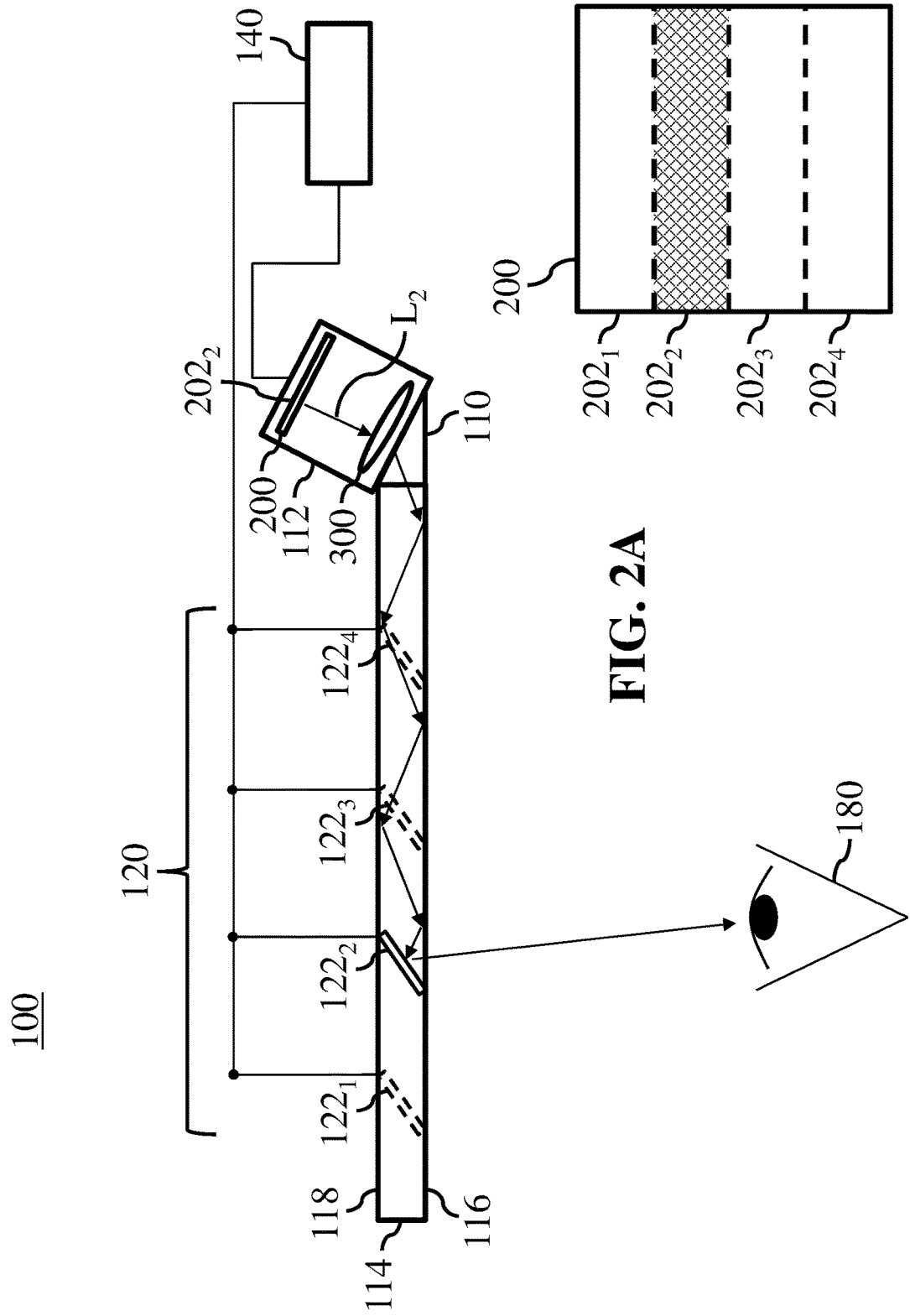
FIG. 2A is a schematic diagram of the optical system of FIG. 1A with a second facet activated according to an embodiment.
FIG. 2B is a schematic diagram of the example image generator of FIG. 1B with a second display region activated according to an embodiment.

In optical systems such as near-eye display systems, light beams are output from a display system to a target surface such as the eye of a user that is in close proximity to the display system. Often such optical systems illuminate the entire eye, or the entire pupil of the eye, when projecting an image. In some cases, such a blanket illumination of the eye or pupil can be costly in terms of power efficiency for the near-eye display system, resulting in reduced battery life or increased power consumption.

In some cases, external light sources may cause the optical system to present ghost images to the eye. For example, light beams from external light sources may enter the optical system and be directed onto the eye at the same time as a target image generated by the optical system. Such ghost images can be distracting to a user, cause glare, or negatively impact the quality of the target image that is being projected onto the eye.

With reference to FIGS. 1A, 1B, 2A, 2B, 3A, 3B, 4A, 4B and 5, an example optical system 100 is described. Optical system 100 comprises an image projection assembly 110 and a controller 140. In some embodiments, optical system 100 may also comprise one or more of an eye tracking system 600 and a light source detection system 602.

Controller 140 comprises a computing device having one or more processing devices, memory or other components. For example, controller 140 may comprise a central processing unit (CPU), field-programmable gate array (FPGA), microcontroller, dedicated circuitry or any other components. Controller 140 is configured to control a projection optics device (POD) to generate and output images to a light-guide optical element (LOE) for projection to an eye as will be described in more detail below.

In some embodiments, controller 140 may be integrated into image projection assembly 110 or integrated into a device comprising image projection assembly 110 such as, e.g., glasses, a head mounted display or another device. In some embodiments, controller 140 may be located remote from image projection assembly 110. For example, image projection assembly 110 may comprise a wired or wireless communication device that is configured to communicate with controller 140. As an example, controller 140 may be included as part of a mobile device, or other computing device that is separate from image projection assembly 110 or a device including image projection assembly 110.

Eye tracking system 600 is optional and is configured to track the location of the pupil of an eye 180 of a user and provide corresponding location information to controller 140. In some embodiments, eye tracking system 600 may comprise, for example, a camera or other device that may be configured to track a location of the pupil or generate information that may be utilized to determine a location of the pupil.

Light source detection system 602 is optional and is configured to detect light sources that may impact optical system 100, e.g., the sun, streetlamps, headlights or other light sources, and to provide corresponding information to controller 140, e.g., a direction of the light source, intensity of the light source or any other information about the light source. As an example, light source detection system 602 may comprise a camera, infrared detector or any other device that is configured to detect light sources external to optical system 100 or to generate information that may be utilized by controller 140 to identify and determine the characteristics of a light source such as, e.g., the direction, intensity or any other information about the light source.

Image projection assembly 110 comprises a projection optics device (POD) 112 and a light-guide optical element (LOE) 114 and is configured to utilize 1-dimensional (1D) or 2-dimensional (2D) pupil expansion to project an image onto an eye 180 of the user.

POD 112 comprises an image generator 200, collimating optics 300 or other components that are sometimes included in an image projection assembly such as, e.g., a spatial light modulator (SLM). Some or all of these components may be arranged on surfaces of one or more polarizing beamsplitter (PBS) cubes or other prism arrangements in some embodiments. Image generator 200 comprises one or more components that provide illumination, e.g., light beams, laser beams or other forms of illumination, that correspond to an image to be projected onto eye 180 of the user. For example, image generator 200 comprises light emitting diodes (LEDs), an organic light emitting diode (OLED) display element, a backlit liquid crystal display (LCD) panel, a micro-LED display, a digital light processing (DLP) chip, a liquid crystal on silicon (LCOS) chip or other components.

In a case where POD 112 comprises an SLM (not shown), the SLM may be implemented as a light emitting SLM comprising components such as, e.g., an OLED display element, a backlit LCD panel, a micro-LED display, a DLP chip or another light emitting component, or may be implemented as a reflective SLM comprising components such as, e.g., an LCOS chip. A beam splitter cube block may be interposed between collimating optics and the SLM to allow delivery of illumination to the surface of the SLM. The SLM may be configured to modulate the projected intensity of each pixel of the illumination to generate the image. For example, the SLM may provide a light beam that is divergent in the plane of LOE 114, e.g., the plane of the major LOE surfaces 116 and 118 described below, from each pixel of the display.

Alternatively, POD 112 may include a scanning arrangement, e.g., a fast-scanning mirror, which scans illumination from a light source across an image plane of POD 112 while the intensity of the illumination is varied synchronously with the motion on a pixel-by-pixel basis to project a desired intensity for each pixel.

POD 112 also comprises a coupling-in arrangement for injecting the illumination of the image into LOE 114, e.g., a coupling-in reflector, angled coupling prism or any other coupling-in arrangement. In some embodiments, coupling between POD 112 and LOE 114 may include a direct coupling, e.g., POD 112 may be in contact with a portion of LOE 114, or may include a coupling via an additional aperture expanding arrangement for expanding the dimension of the aperture across which the image is injected in the plane of LOE 114.

LOE 114 comprises a waveguide including first and second parallel major LOE surfaces 116 and 118 and edges that are not optically active, as shown in, for example, FIGS. 1A-4B. LOE 114 also comprises a coupling-out arrangement 120 that is configured to direct the illumination out of LOE 114 for projection onto eye 180 of the user. In some embodiments, coupling-out arrangement 120 is illustrated as a plurality of parallel surfaces, also referred to herein as facets 122₁, 122₂, 122₃ and 122₄, that are arranged within LOE 114 at an oblique angle to major LOE surfaces 116 and 118 of LOE 114. Facets 122₁, 122₂, 122₃ and 122₄ may also be referred to herein collectively or individually as facets 122. While four facets 122₁, 122₂, 122₃ and 122₄ are illustrated in FIGS. 1A-4B in an illustrative embodiment, LOE 114 may alternatively comprise a larger number of facets 122 or a smaller number of facets 122 in other embodiments.

Each facet 122 is selectively activatable between a state in which the facet 122 has a high transmissivity of light and a state in which the facet 122 has a high reflectivity of light. As an example, in some embodiments, facet 122₁ may be activated to have 100% reflectivity and 0% transmissivity and may be deactivated to have 0% reflectivity and 100% transmissivity. In some embodiments, the amount of reflectivity and transmissivity may be adjustable for each facet 122 such that, for example, facet 122₁ may be adjusted to have partial reflectivity and partial transmissivity, e.g., have 25% reflectivity and 75% transmissivity, 50% reflectivity and 50% transmissivity, 75% reflectivity and 25% transmissivity or any other amount of reflectivity and transmissivity. As an example, controller 140 may be configured to selectively activate and adjust the reflectivity and transmissivity of each facet 122. In some embodiments, controller 140 may be configured to selectively activate and adjust the reflectivity and transmissivity of each facet 122 for particular angles or ranges of angles of light beams, e.g., high transmissivity for some angles or a range of angles of light beams and high reflectivity for other angles or ranges of angles of light beams.

Image generator 200 comprises display regions 202₁, 202₂, 202₃ and 202₄ that are selectively activatable by controller 140 to generate corresponding light beams $L_1$, $L_2$, $L_3$ and $L_4$ that enter LOE 114 and reflect off of major LOE surfaces 116 and 118 with different angles. Display regions 202₁, 202₂, 202₃ and 202₄ may also be referred to herein individually and collectively as display region(s) 202. Light beams $L_1$, $L_2$, $L_3$ and $L_4$ may also be referred to herein individually or collectively as light beam(s) L. While four display regions 202 and corresponding light beams L are shown in the example image generator 200 of FIGS. 1B, 2B, 3B and 4B, image generator 200 may comprise a larger or smaller number of display regions 202 and corresponding light beams L in other embodiments. Each display region 202 comprises one or more pixels or other display elements that may be selectively activated by controller 140. In some embodiments, for example, each display region 202 comprises a single pixel. In other embodiments, each display region 202 may comprise a grouping of pixels, a horizontal line of pixels, a vertical line of pixels or any other grouping of pixels.

As shown in FIGS. 1A-4B, for example, light beams L travel through LOE 114 towards facets 122 by reflecting off major LOE surfaces 116 and 118. For example, major LOE surfaces 116 and 118 may provide total internal reflection (TIR) for any light beams L traveling through LOE 114. Light beams L travel through any inactive facets 122, e.g., due to the high transmissivity of the inactive facets 122. When a light beam L encounters an active facet 122, light beam L is redirected by the active facet 122 out of LOE 114 due to the high reflectivity of the active facet 122, e.g., towards eye 180.

FIG. 1A illustrates a first example scenario where display region 202₁ and facet 122₁ are active and light beam $L_1$ generated by display region 202₁ travels through LOE 114. In this scenario, display regions 202₂, 202₃ and 202₄ and facets 122₂, 122₃ and 122₄ are inactive. Light beam $L_1$ reflects off major LOE surfaces 116 and 118, passing through inactive facets 122₄, 122₃ and 122₂ in order before reflecting off of active facet 122₁ and being redirected towards eye 180.

FIG. 2A illustrates a second example scenario where display region 202₂ and facet 122₂ are active and light beam $L_2$ generated by display region 202₂ travels through LOE 114. In this scenario, display regions 202₁, 202₃ and 202₄ and facets 122₁, 122₃ and 122₄ are inactive. Light beam $L_2$ reflects off major LOE surfaces 116 and 118, passing through inactive facets 122₄ and 122₃ in order before reflecting off of active facet 122₂ and being redirected towards eye 180. In this scenario, because facet 122₂ is active and fully reflective, e.g., 100% reflective, light beam $L_2$ does not reach facet 122₁. In some embodiments, facet 122₂ may not be fully reflective even when active. In such a case, light beam $L_2$ may reach facet 122₁ but is not reflected because facet 122₁ is inactive.

FIG. 3A illustrates a third example scenario where display region 202₃ and facet 122₃ are active and light beam $L_3$ generated by display region 202₃ travels through LOE 114. In this scenario, display regions 202₁, 202₂ and 202₄ and facets 122₁, 122₂ and 122₄ are inactive. Light beam $L_3$ reflects off major LOE surfaces 116 and 118, passing through inactive facet $122_4$ before reflecting off of active facet $122_3$ and being redirected towards eye 180. In this scenario, because facet $122_3$ is active and fully reflective, e.g., 100% reflective, light beam $L_3$ does not reach facets $122_1$ and $122_2$. In some embodiments, facet $122_3$ may not be fully reflective even when active. In such a case, light beam $L_3$ may reach one or more of facets $122_1$ and $122_2$ but is not reflected because facets $122_1$ and $122_2$ are inactive.

FIG. 4A illustrates a fourth example scenario where display region $202_4$ and facet $122_4$ are active and light beam $L_4$ generated by display region $202_4$ travels through LOE 114. In this scenario, display regions $202_1$, $202_2$ and $202_3$ and facets $122_1$, $122_2$ and $122_3$ are inactive. Light beam $L_4$ reflects off major LOE surfaces 116 and 118 before reflecting off of active facet $122_4$ and being redirected towards eye 180. In this scenario, because facet $122_4$ is active and fully reflective, e.g., 100% reflective, light beam $L_4$ does not reach facets $122_1$, $122_2$ and $122_3$. In some embodiments, facet $122_4$ may not be fully reflective even when active. In such a case, light beam $L_4$ may reach one or more of facets $122_1$, $122_2$ and $122_3$ but is not reflected because facets $122_1$, $122_2$ and $122_3$ are inactive.

As seen in FIGS. 1A-4B, while a different combination of display regions 202 and facets 122 are active in each figure, the generated light beams $L_1$, $L_2$, $L_3$ and $L_4$ are each directed toward the eye 180, but with different angles. For example, the relative position of each facet 122 and the pupil of eye 180 defines which portion of an image field of view (FOV) can be projected by that facet 122 towards the pupil of eye 180 by each display region 202. In some embodiments, in order to optimize the energy efficiency of optical system 100, only the portion of the image FOV that can be projected by each facet 122 is generated by the corresponding display region 202. For example, for a particular portion of the image FOV, controller 140 may activate only the display region 202 and corresponding facet 122 that will direct that portion of the image FOV to the location of the pupil of eye 180.

Figure 5:
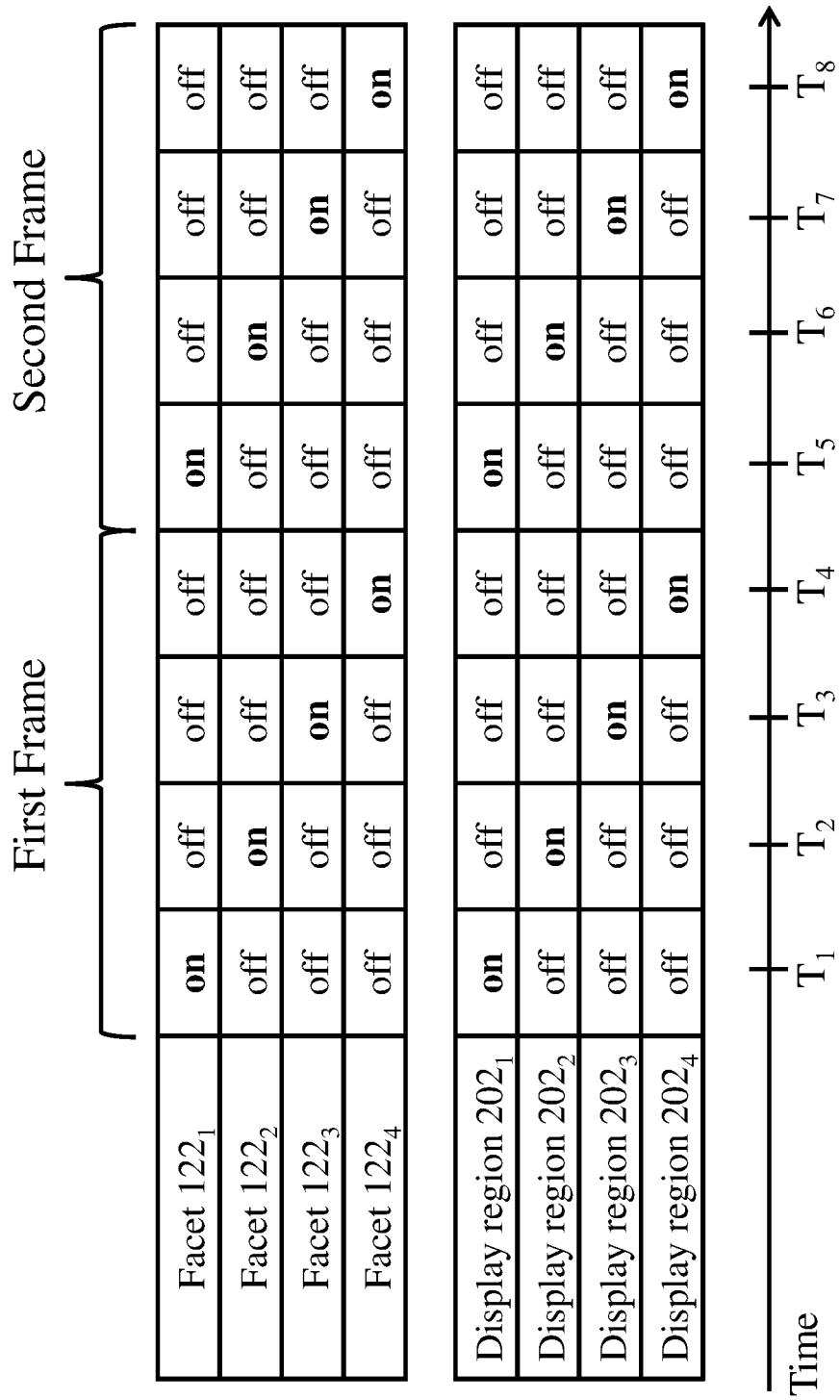
FIG. 5 is a table and chart illustrating sequential activation of the facets and display regions of FIGS. 1A-4B over time according to an embodiment.

With reference to FIG. 5, in some embodiments, combinations of display regions 202 and facets 122 may be selectively and sequentially activated to project different portions of the image FOV for each frame of the same image onto eye 180.

As an example, facet $122_1$ and display region $202_1$ may be activated at a time $T_1$ to direct a first portion of the image FOV of a first frame on eye 180, facet $122_2$ and display region $202_2$ may be activated at a time $T_2$ to direct a second portion of the image FOV of the first frame on eye 180, facet $122_3$ and display region $202_3$ may be activated at a time $T_3$ to direct a third portion of the image FOV of the first frame on eye 180, facet $122_4$ and display region $202_4$ may be activated at a time $T_4$ to direct a fourth portion of the image FOV of the first frame on eye 180, facet $122_1$ and display region $202_1$ may be activated at a time $T_5$ to direct the first portion of the image FOV of a second frame on eye 180, facet $122_2$, display region $202_2$ may be activated at a time $T_6$ to direct the second portion of the image FOV of the second frame on eye 180, facet $122_3$ and display region $202_3$ may be activated at a time $T_7$ to direct the third portion of the image FOV of the second frame on eye 180, facet $122_2$, display region $202_2$ may be activated at a time $T_5$ to direct the fourth portion of the image FOV of the second frame on eye 180 and so on.

As described above, portions of the image FOV of the first frame of the image may be sequentially generated and directed onto eye 180 during times $T_1$-$T_4$ while the portions of the image FOV of the second frame of the image may be generated and directed onto eye 180 during times $T_5$-$T_8$. Times $T_1$-$T_8$ may comprise any unit of time that is configured to provide a target framerate for projecting frames of an image onto eye 180. For example, times $T_1$-$T_8$ may be in milli-seconds (ms) or any other unit of measure.

Because only one active facet 122 and one corresponding display region 202 are utilized at a time to project a portion of the image FOV onto eye 180 with the active facet 122 being fully reflective and all other facets 122 being fully transmissive, the energy efficiency of POD 112 is improved over optical systems having static semi-reflective facets since potentially 100% or close to 100% of the light beam generated by image generator 200 is reflected out of LOE 114 toward eye 180 by the active facet 122.

For example, some LOEs comprise semi-reflective facets that are configured to direct light beams out of the LOE that propagate within the LOE at different angles. In these LOEs, only certain angles of light beams will be reflected by each facet while other angles will be allowed to pass through the facets. Because of this effect, portions of the light provided to the LOE by the POD may be reflected by more than one facet, even if those portions light are not directed toward the eye of the user which may result wasted power and inefficiencies in the POD.

In addition, the use of selectively activatable facets 122 and display regions 202 enables optical system 100 to provide a larger available image FOV for each facet 122 as compared to optical systems having LOEs with static semi-reflective facets. For example, each static semi-reflective facet may only be able to provide light beams to the eye that correspond to a particular image FOV depending on the angle at which they are reflective. Because facets 122 may be fully reflective when activated, a larger available image FOV is possible because facets 122 can redirect light from a larger number of angles.

In some embodiments, facets 122 may be activated by controller 140 in semi-reflective states that are similar to the static semi-reflective facets described above where only certain angles of light beams will be reflected by each facet 122 while other angles will be allowed to pass through each facet 122 such that portions of the light provided to LOE 114 by POD 200 may be reflected by more than one facet even if those portions of light are not directed toward the eye of the user. For example, facets 122 may be activated by controller 140 to mimic the functionality of the static semi-reflective facets described above in some embodiments.

Figures 6A, 6B:
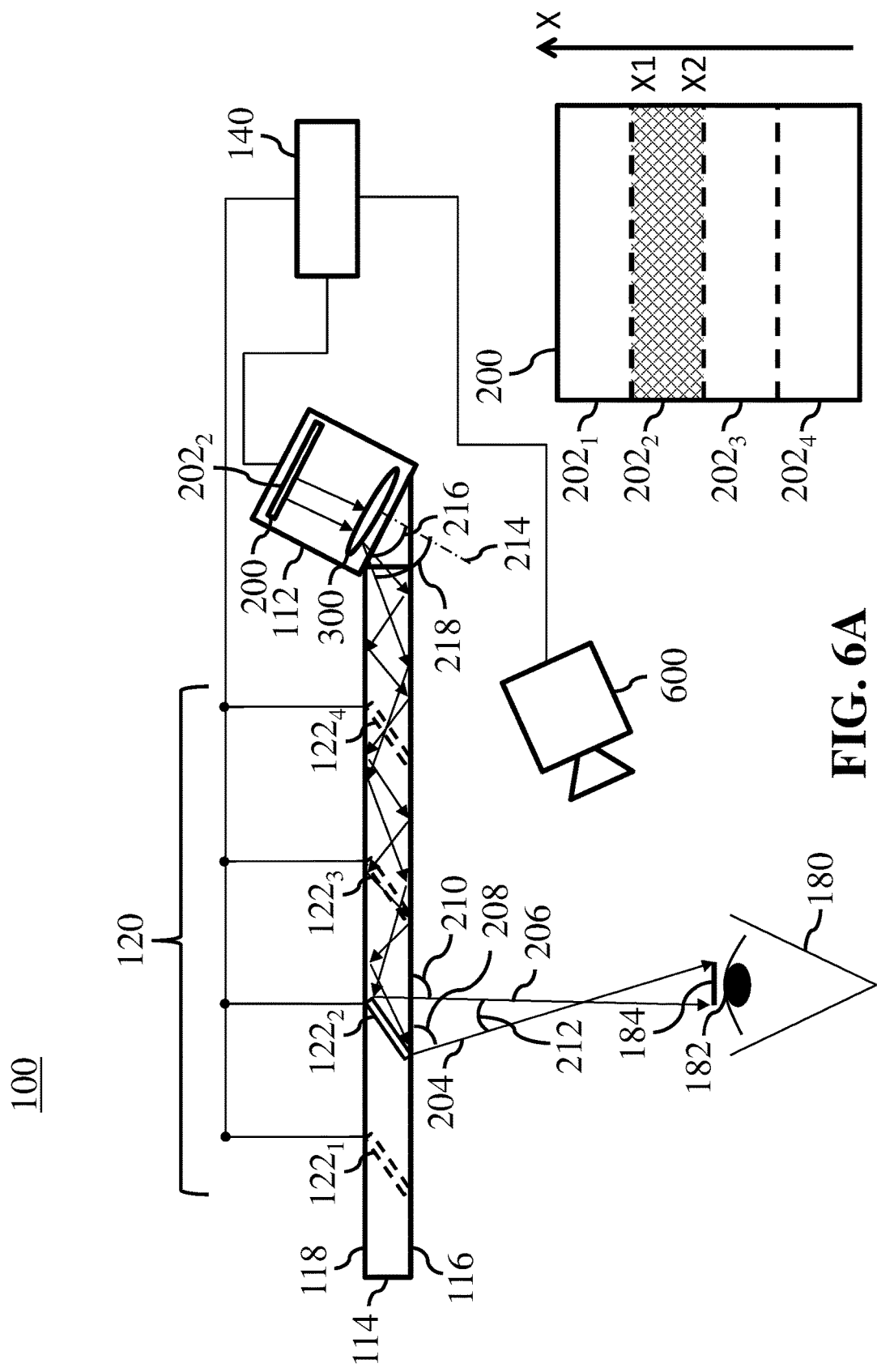
FIGS. 6A and 6B are schematic diagrams of the optical system of FIGS. 1A and 1B illustrating the direction of light beams onto an eye using an eye tracking system according to an embodiment.

With reference to FIGS. 6A and 6B, in some embodiments, controller 140 may utilize location information received from eye tracking system 600 to determine a location of the pupil 182 of eye 180 and activate the corresponding combination of display regions 202 and facets 122 to project portions of the image FOV toward a portion 184 of an eye motion box (EMB) that corresponds to the determined location of pupil 182 of eye 180. For example, the relationship between the portion of the image FOV projected towards eye 180 by active facet $122_2$ and the corresponding display region $202_2$ of image generator 200 that generates the portion of the image FOV that is projected through this portion 184 of the EMB is illustrated in FIGS. 6A and 6B.

Light beams 204 and 206 connect the edges of facet $122_2$ and pupil 182 of eye 180. Eye tracking system 600 generates location information corresponding to the position of pupil 182 relative to LOE 114 and provides the location information to controller 140. Using the location information, controller 140 determines the angles and directions along which light beams 204 and 206 need to travel relative to LOE 114 to be projected onto portion 184 of the EMB that corresponds to the position of pupil 182. For example, controller 140 may be configured to determine the angles 208 and 210 that light beams 204 and 206 need to reflect off of facet $122_2$ relative to major LOE surface 116 of LOE 114. The angle 212 between light beams 204 and 206 defines the extension of the image FOV projected by facet $122_2$ into pupil 182. Angles 208 and 210 of light beams 204 and 206 relative to major LOE surface 116 may be converted, e.g., using geometrical optics laws such as, e.g., geometric laws of light reflection and refraction, to corresponding angles of light beams 204 and 206 with the projector optical axis 214 at the exit of the POD 112. As shown in FIG. 6A, angle 208 corresponds to an angle 216 and angle 210 corresponds to an angle 218 at the exit of POD 112 relative to projector optical axis 214. For example, in a system in which the image FOV central direction is orthogonal to major LOE surface 116 when ejected towards the EMB or eye pupil, and in which the image FOV central direction coincides with the optical axis of POD 112, angle 216 is equal to 90 degrees minus angle 208 and angle 218 is equal to 90 degrees minus angle 210.

Distortion laws may then be applied to determine the coordinates X1 and X2 of activated display region $202_2$ via the focal length of the collimating optics 300 angle α, i.e., angle 218, and angle β, i.e., angle 216 according to equations (1) and (2) below:

$$X1 = f \times \tan(\alpha) \quad (1)$$

$$X2 = f \times \tan(\beta) \quad (2)$$

In this manner, energy usage by image projection assembly 110 may be optimized and energy efficiency of optical system 100 may be increased since the energy is used to illuminate only the location of pupil 182.

With reference to FIGS. 7A and 7B, in some embodiments, location information about pupil 182 may not be available for use by controller 140, e.g., if no eye tracking system 600 is present or active. In this embodiment, the actual location of pupil 182 is unknown to controller 140. In such a case, instead using portion 184 of the EMB that corresponds to the actual location of pupil 182, a larger portion 186 of the EMB is used for the calculations. In some embodiments, portion 186 corresponds to the entire EMB in which pupil 182 can be located during the operation of optical system 100 while portion 184 corresponds to only part of the EMB. Using portion 186 as the target instead of portion 184, controller 140 may determine the angles corresponding to the needed light beams in a similar manner to that described above for FIGS. 6A and 6B and activate the corresponding facet 122 and display region 202 accordingly.

In some embodiments, controller 140 may determine that multiple display regions 202 need to be activated to project a portion of the image FOV toward portion 186 of the EMB. In such a case, controller 140 may be configured to selectively activate each of the determined display regions 202 or, in some embodiments, selectively activate only the select pixels of each of the display regions 202 that are needed to illuminate portion 186 of the EMB, e.g., to activate a combined display region 220 as shown in FIG. 7B. For example, display region 220 comprises a portion of display region $202_1$ and a portion of $202_2$. In some embodiments, the activation of a combined display region 220 may be utilized with the embodiment of FIGS. 6A and 6B even where eye tracking system 600 is present. For example, the determined location of pupil 182 may necessitate the activation of portions of multiple display regions 202 by controller 140 in some embodiments.

In some embodiments, controller 140 may determine that multiple facets 122 need to be sequentially activated for each display region 202 to provide the corresponding image FOV to each possible location of pupil 182 in EMB 186. For example, a particular display region 202 may be activated by controller 140 to provide a particular image FOV or portion of the particular image FOV to eye 180. For the particular display region 202 that is being activated, each facet 122 is configured to direct the image FOV onto a different location when activated. In a case where there is uncertainty with respect to the location of pupil 182, at least some of facets 122 may be activated sequentially to ensure that the corresponding image FOV is directed to a subset of locations of pupil 182 in EMB 186.

In some cases, only some of facets 122 may be configured to direct light from the particular display region 202 onto EMB 186 while other facets 122 may be configured to direct light from the particular display region 202 outside of EMB 186, e.g., depending on the angle of the light in LOE 114. In some embodiments, only a grouping of facets 122 that are configured to direct light from the particular display region 202 onto EMB 186 may be sequentially activated to direct the image FOV from the particular display region 202 onto each portion of EMB 186 where pupil 182 may be located while other facets 122 that will not direct the image FOV onto EMB 186 for the particular display region 202 may not be activated. In some embodiments, a different grouping of facets 122 may need to be sequentially activated for each display region 202 to direct the corresponding image FOV onto each portion of EMB 186, e.g., since each display region 202 provides light at a different angle to LOE 114 and facets 122.

Figure 8:
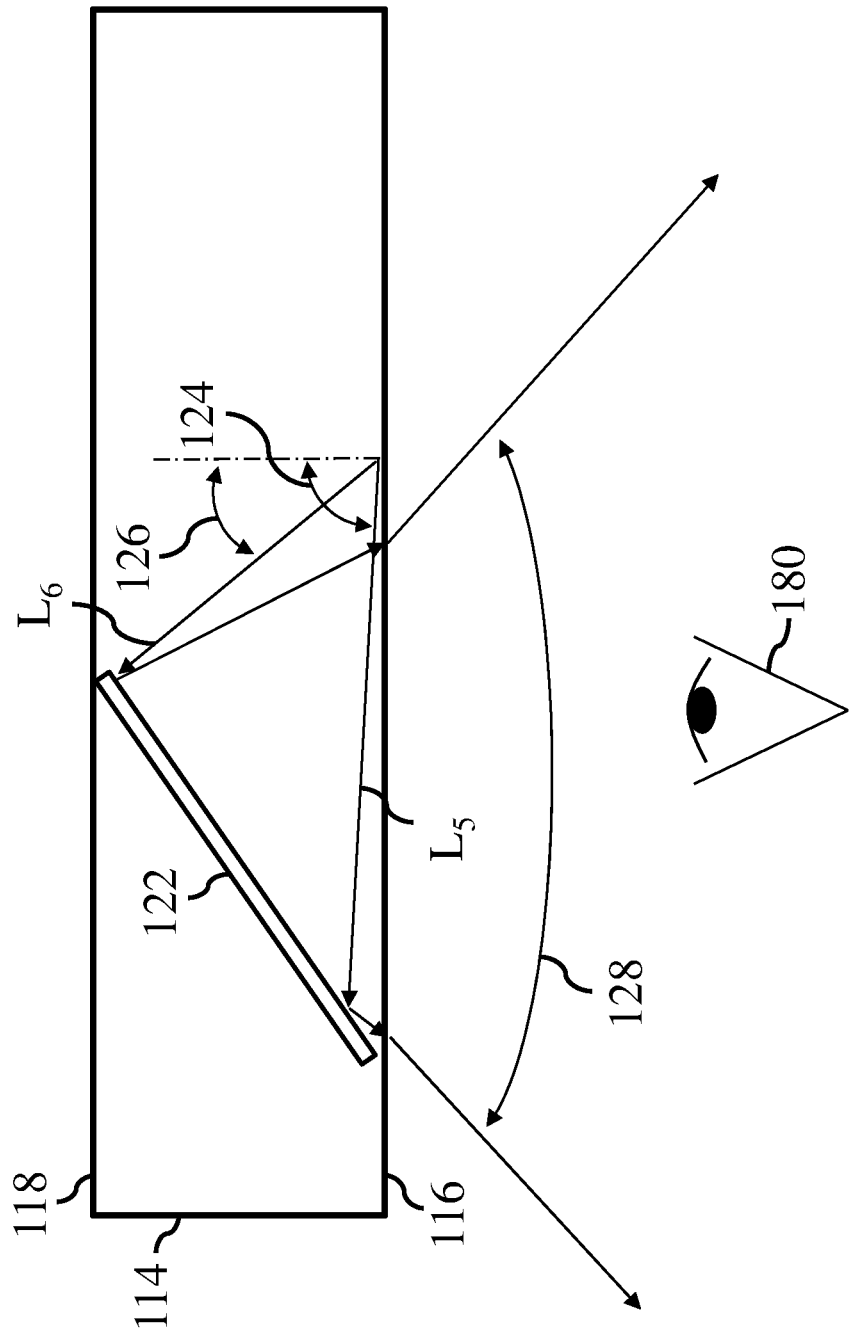
FIG. 8 is a schematic diagram of an example light-guide optical element (LOE) of the optical system of FIG. 1 and showing an available range of field of view (FOV) for a single activated facet according to an embodiment.

With reference to FIG. 8, in an illustrative embodiment, the available image FOV that can be projected toward eye 180 for an active facet 122 of LOE 114 may be significantly larger than the image FOV that may be projected by a static semi-reflective facet such as that described above since active facet 122 is fully reflective. This is because all light generated by an active display region 202 will be reflected by the only active facet 122 and will pass through any inactive facets 122 regardless of the angle of the light beam since they are fully transmissive. The available image FOV of the active facet 122 is limited only by the total internal reflection of major LOE surfaces 116 and 118 of LOE 114 rather than which particular angles of light can be reflected as in the case of the semi-reflective facets described above.

For example, as seen in FIG. 8, light beams $L_5$ and $L_6$ are generated by corresponding display regions of image generator 200 (FIG. 1A) and are reflected by major LOE surfaces 116 and 118 of LOE 114 until they reach active facet 122. In this example, light beam $L_5$ reflects off of major LOE surface 116 at an angle 124 to the normal of major LOE surface 116 while light beam $L_6$ reflects off of major LOE surface 116 at an angle 126 to the normal of major LOE surface 116. Light beam $L_5$ is shown reflecting off of active facet 122 at a shallow angle while light beam $L_6$ is shown reflecting off of active facet 122 at a steep angle. In an embodiment, angle 124 is the maximum propagation angle of LOE 114 while angle 126 is the total internal reflection critical angle of LOE 114. For example, angle 124 may comprise 90 degrees, 85 degrees or any other value. In some embodiments, the maximum available angle 124 may be based on the manner in which light beams are injected into LOE 114. Angle 124 and angle 126 together define the maximum available image FOV that can be provided by an individual facet 122.

Example angles 124 and 126 illustrate an available image FOV that takes full advantage of the entire active facet 122 and allows active facet 122 to be utilized for projecting an image FOV onto eye 180 at any location within the EMB. For example, for any location of eye 180, the corresponding display region 202 that is configured to generate a light beam that will reflect within LOE 114 at an angle that corresponds to the location of eye 180 when reflected off of active facet 122 and refracted by major LOE surface 116 as it passes through major LOE surface 116 may be selectively activated to present an image FOV to eye 180.

Because the available image FOV for each selectively activatable facet 122 is larger than that of a static semi-reflective facet, in some embodiments, a smaller number of facets 122 may be utilized to provide the same image FOV coverage which also enhances the efficiency of optical system 100.

Figure 9:
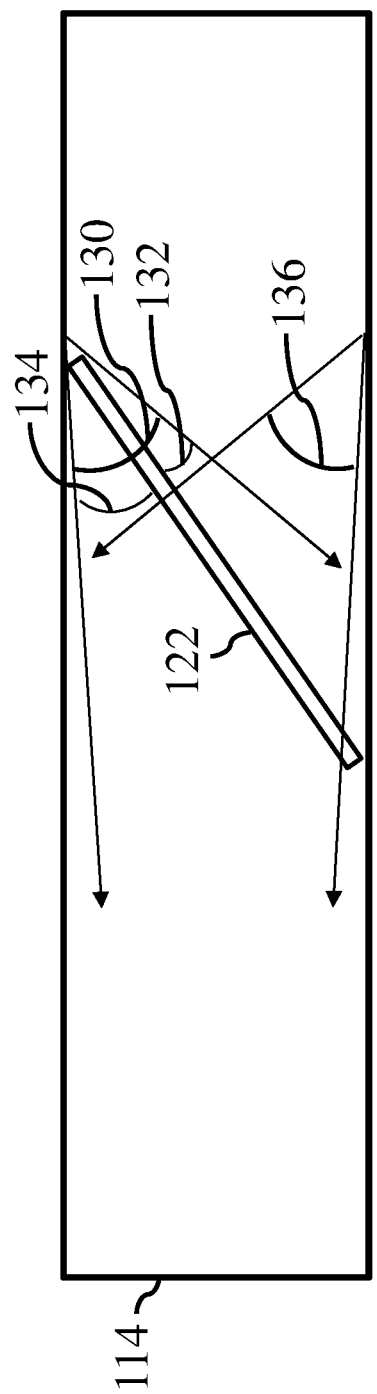
FIG. 9 is a schematic diagram of an example LOE of the optical system of FIG. 1 and showing a difference between an FOV split by a facet and a conjugated FOV according to an embodiment.

FIG. 9 illustrates an example FOV 136 that propagates in LOE 114 and a conjugated FOV 130. FOV 136 is reflected into conjugated FOV 130 as a result of the total internal reflection of major LOE surfaces 116 and 118 of LOE 114. As seen in FIG. 9, an active facet 122 divides conjugated FOV 130 into two parts, FOV 132 and FOV 134.

In LOEs having the static semi-reflective facets mentioned above, the semi-reflective facets are not able to split the conjugated FOV propagating in the LOE without impacting the resulting image. For example, a semi-reflecting coating often has a very high reflectivity at large angles of incidence. Because of this very high reflectivity, portions of conjugated FOV 130 that are propagating at angles close to the angle of the semi-reflective facet are reflected by the semi-reflective facet and contribute to the ghost images. In order to reduce the presence of such ghost images, an optical system having an LOE with semi-reflective facets may provide an image within either FOV 134, e.g., at shallow angles, or FOV 132, e.g., an angle sufficiently large to not be reflected by the semi-reflecting coating, but not within the full conjugated FOV 130 up to and including angles that are close to the angle of the facet.

In illustrative embodiments, facets 122 can be deactivated and made transparent even at high angles of incidence such that conjugated FOV 130 will propagate through them without generating ghost images. This results in the ability to take advantage of conjugated FOV 130 to generate a larger image FOV for active facet 122 as shown in FIG. 8 as compared to the FOV in LOEs with semi-reflective facets. In one example scenario, LOE 114 may comprise a refractive index of 1.8 and a critical angle of 33.7 degrees. The FOV propagating within LOE 114 may comprise about 51.3 degrees and the FOV output by an active facet 122 of LOE 114 in this example scenario may comprise a FOV of about 93 degrees.

Figure 10A:
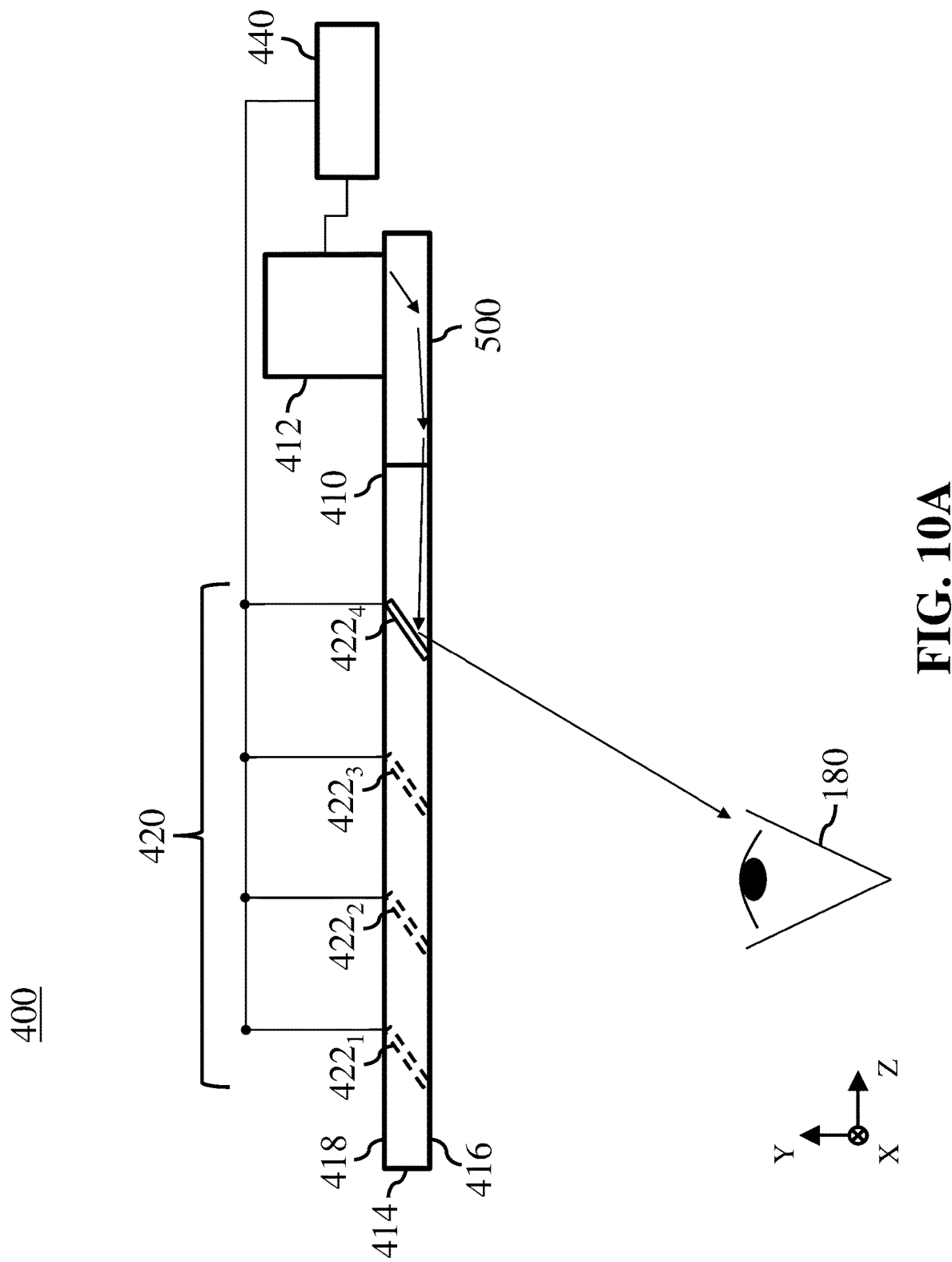
FIG. 10A is a schematic diagram of an example optical system having an additional LOE for 2-dimensional (2D) expansion according to an embodiment.
Figure 10B:
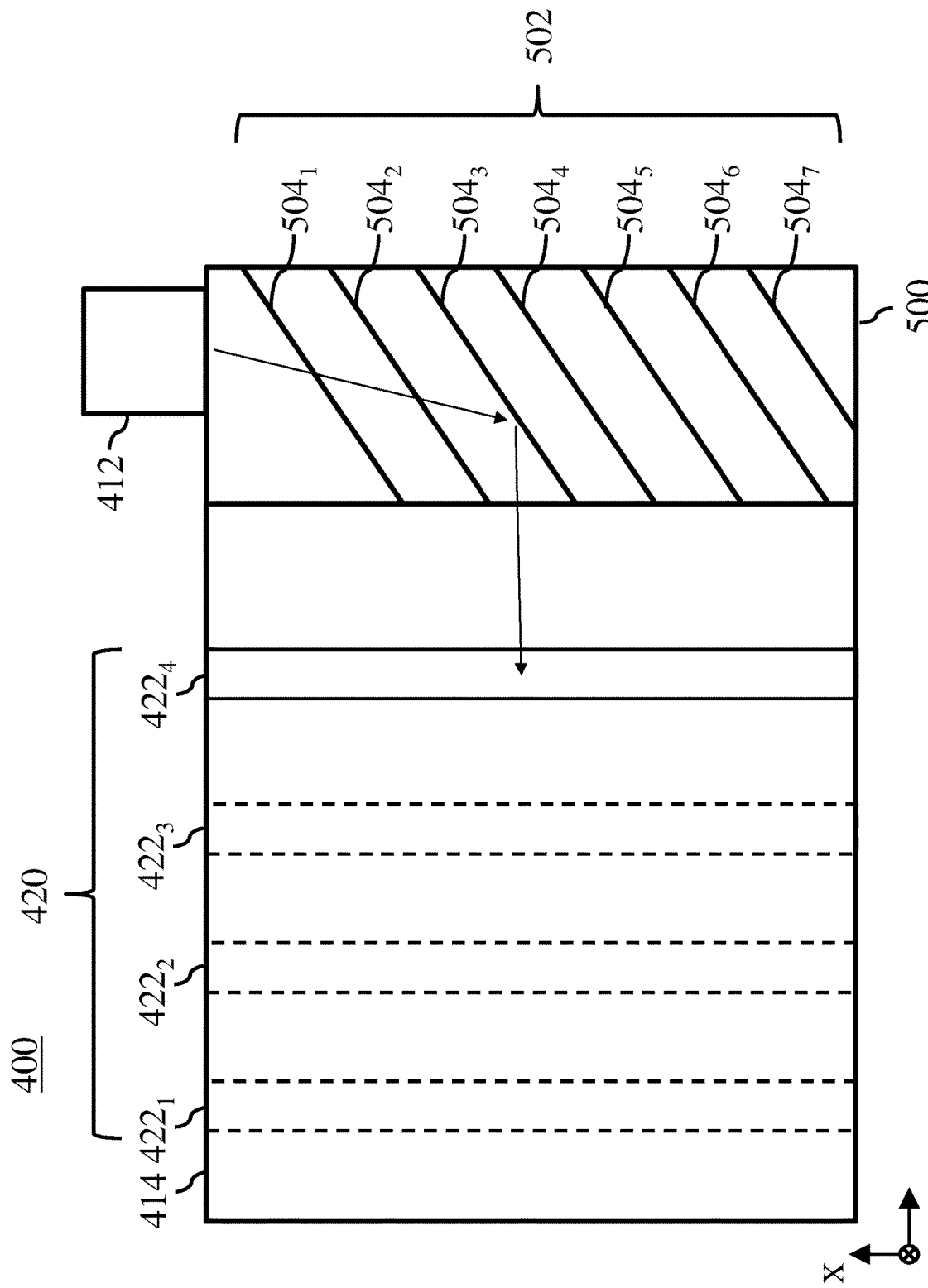
FIG. 10B is a schematic diagram of an example image projection assembly of the optical system of FIG. 10A according to an embodiment.

With reference to FIGS. 10A and 10B, an example optical system 400 according to another embodiment is described. As illustrated in FIGS. 10A and 10B, like elements have similar reference numbers to optical system 100 of FIGS. 1A-4B. For example, optical system 400 comprises an image projection assembly 410 comprising a POD 412 and an LOE 414, a controller 440 and other components similar to those described above for optical system 100. LOE 414 comprises major LOE surfaces 416 and 418 and a coupling-out arrangement 420 that comprises facets $422_1$, $422_2$, $422_3$ and $422_4$. In the embodiment of FIGS. 10A and 10B, image projection assembly 410 further comprises an LOE 500 disposed between POD 412 and LOE 414.

LOE 500 comprises a coupling-out arrangement 502 comprising facets $504_1$, $504_2$, $504_3$, $504_4$, $504_5$, $504_6$ and $504_7$ which may also be collectively and individually referred to herein as facet(s) 504. While illustrated as comprising seven facets 504 in the example optical system 400 of FIGS. 10A and 10B, LOE 500 may alternatively comprise a larger or smaller number of facets 504 in other embodiments.

LOE 500 and facets 504 are used for 2D expansion of the LOE exit pupil. In some embodiments, facets 504 may comprise static semi-reflective facets comprising dielectric coatings such as the semi-reflective facets mentioned above. In other embodiments, facets 504 may alternatively comprise selectively activatable facets that are similar to facets 122 of FIGS. 1A-4B and may be selectively activatable by controller 440 in a similar manner to that described above with reference to facets 122, e.g., to an inactive state with 100% transmissivity and 0% reflectivity, to an active state with 0% transmissivity and 100% reflectivity, or to another state having partial transmissivity and partial reflectivity.

Figure 11A:
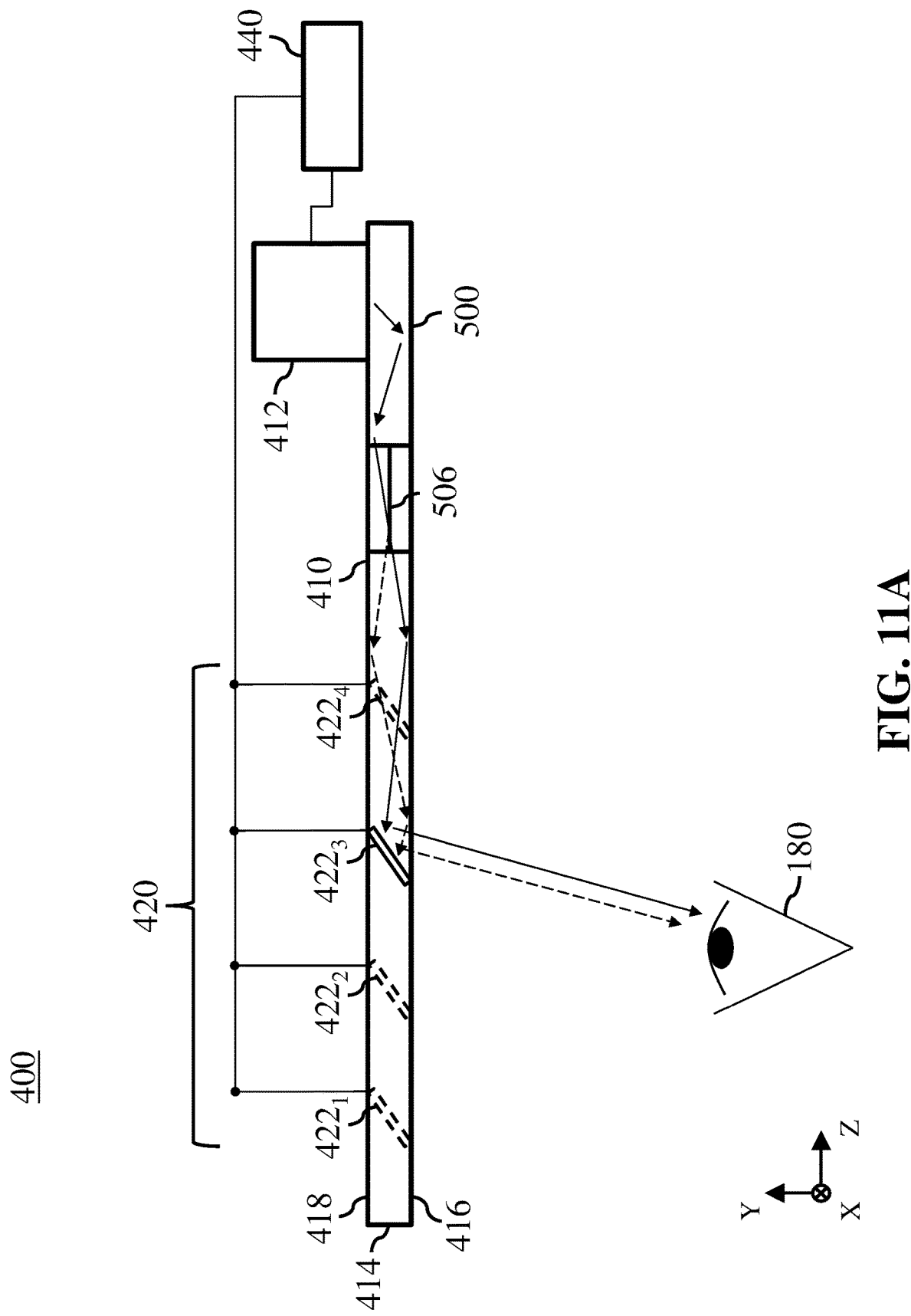
FIG. 11A is a schematic diagram of the optical system of FIG. 10A including a mixer according to an embodiment.
Figure 11B:
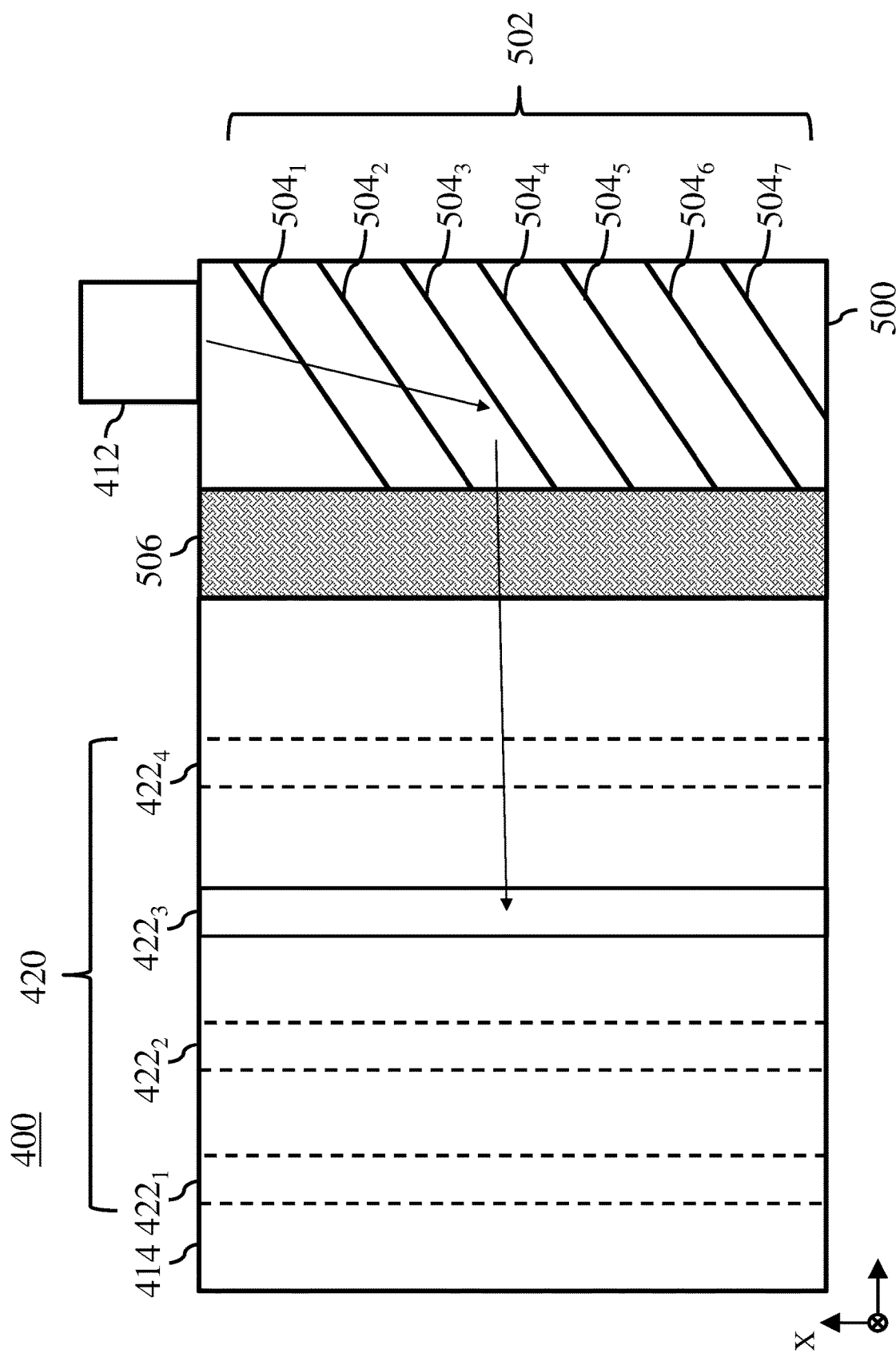
FIG. 11B is a schematic diagram of the example image projection assembly of FIG. 10B including the mixer of FIG. 11A according to an embodiment.

With reference to FIGS. 11A and 11B, another embodiment of optical system 400 is described. In the embodiment of FIGS. 11A and 11B, image projection assembly 410 further comprises a mixer 506 that comprises a semi-reflecting surface inside LOE 414 which is parallel to major LOE surfaces 416 and 418. Mixer 506 splits the light beams in LOE 414 as shown by the solid and dashed arrows in FIG. 11A. The splitting by mixer 506 enables image projection assembly 410 to completely fill the aperture of LOE 414.

Figure 12:
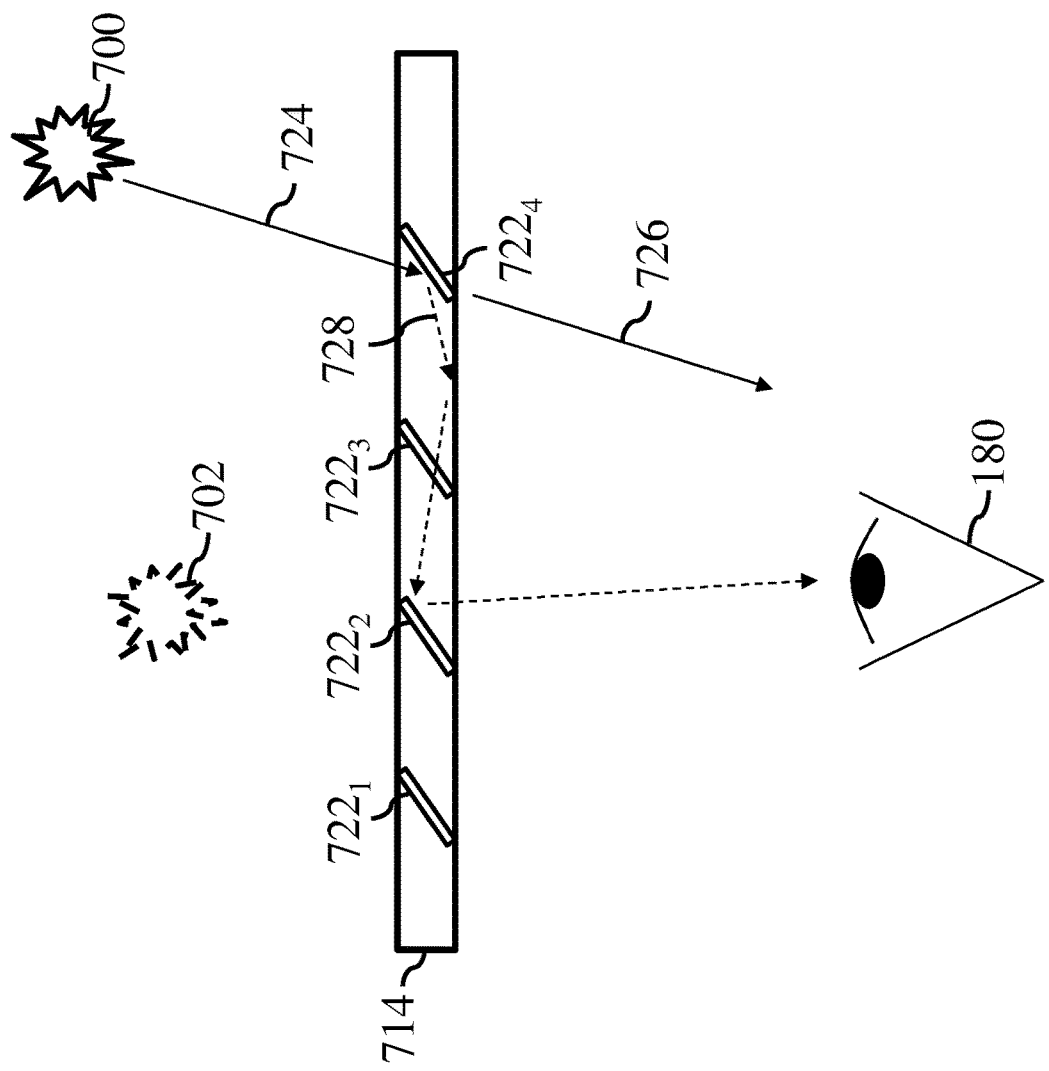
FIG. 12 is a schematic diagram of an example LOE showing an external light source creating ghost images on an eye according to an embodiment.

With reference to FIG. 12, in an example comparative scenario, one or more external light sources 700 and 702 may generate light beams that enter into LOE 714. LOE 714 in this scenario comprises static semi-reflecting facets $722_1$, $722_2$, $722_3$ and $722_4$. As shown in FIG. 12, when light beam 724 from external light source 700 enters LOE 714, it is split at facet $722_4$ with a first portion 726 passing through facet $722_4$ and exiting LOE 714 and a second portion 728 reflecting off of facet $722_4$ and propagating through LOE 714. As seen in FIG. 12, while first portion 726 does not affect eye 180, second portion 728 is directed out of LOE 714 toward eye 180 by facet $722_2$. The propagation and direction of second portion 728 of light beam 724 onto eye 180 by LOE 714 in this scenario may result in ghost images being projected onto eye 180. It is important to note that, in most cases, ghost images result from a reflection of light beams from external light sources by multiple facets of an LOE where a reflection from a single facet does not on its own direct the light beam out of the LOE toward the eye of a user.

Figure 13:
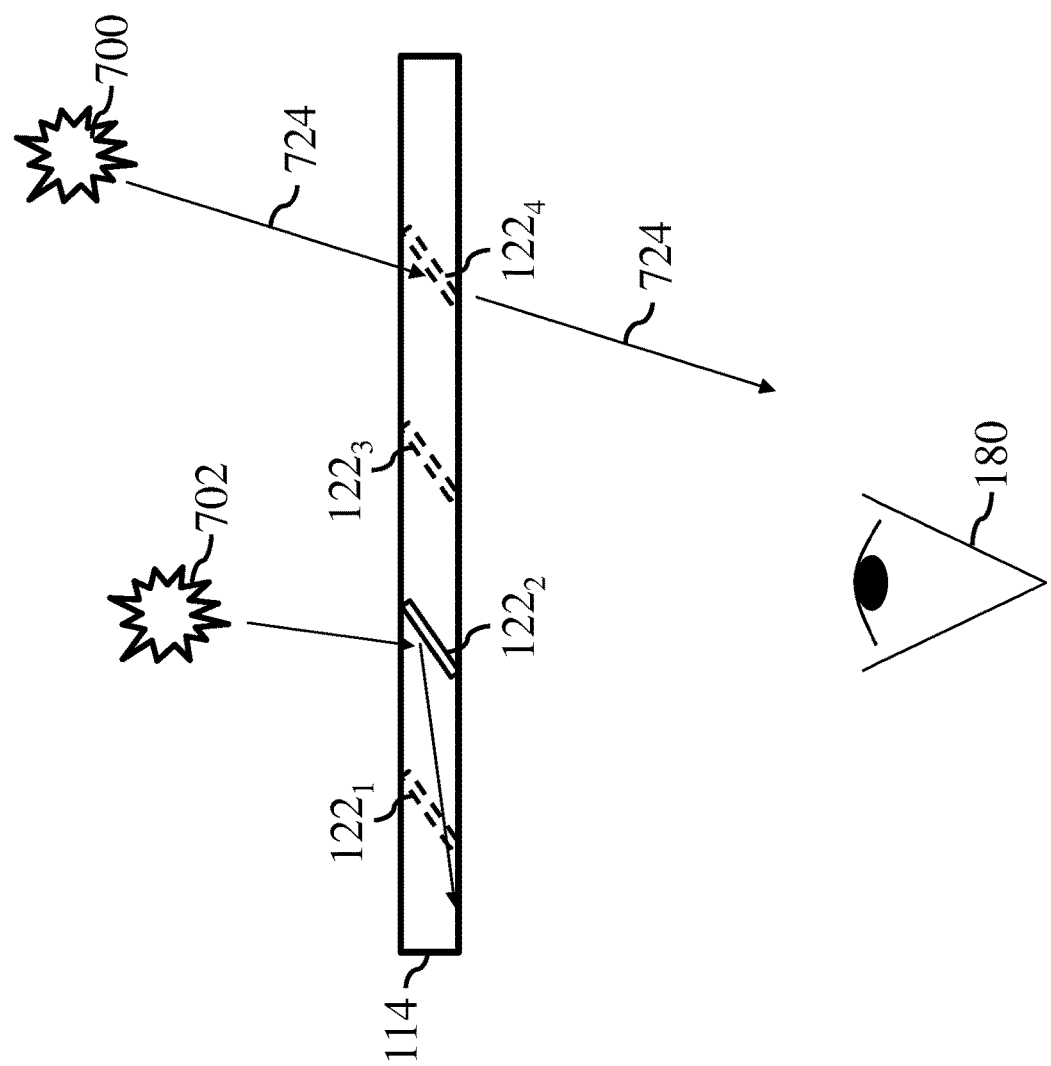
FIG. 13 is a schematic diagram of the LOE of FIG. 1 inhibiting light from an external light source from creating ghost images on an eye according to an embodiment.

With reference to FIG. 13, in another example scenario, LOE 114 is illustrated. In this example, because facet $122_4$ is inactive, light beam 724 is not split by facet $122_4$ and instead passes through LOE 114 without affecting eye 180. In addition, because the active facet 122, facet $122_2$ in this example scenario, is fully reflective, a light beam 730 generated by external light source 702 reflects within LOE 114 but does not split and is not directed toward eye 180 by facet $122_2$. Since facet $122_2$ is the only active facet, no ghost images are produced by light beams 724 and 730.

Figure 14:
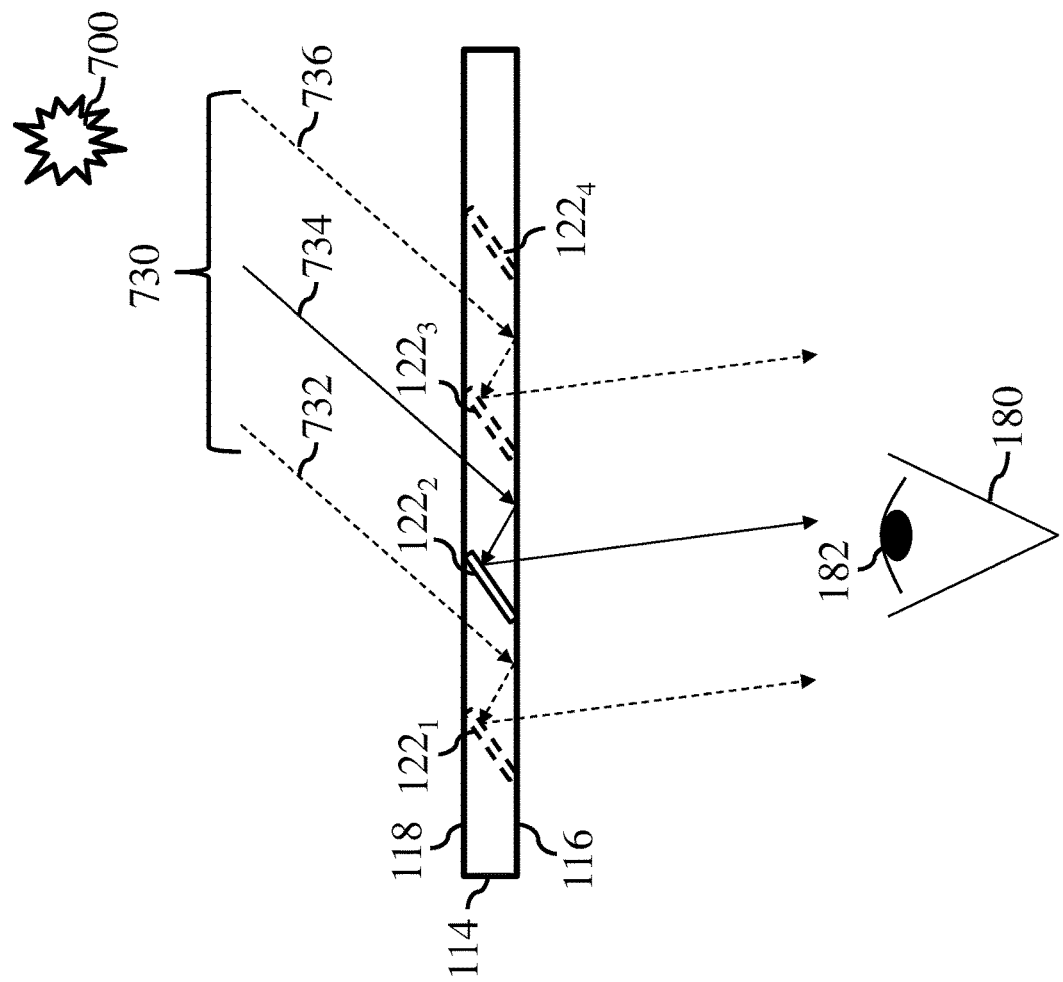
FIG. 14 is a schematic diagram of the LOE of FIG. 1 inhibiting light from an external light source from creating ghost images on an eye according to another embodiment.

With reference to FIG. 14, in another example scenario, collimated light beams 730 are generated by external light source 702 with each light beam 732, 734 and 738 entering different portions of LOE 114 at the same angle. The light beams 730 experience Fresnel reflections on major LOE surface 116 of LOE 114, e.g., due to the angle at which they are propagating within LOE 114. For example, because of the angle at which light beams 730 enter LOE 114, they will not pass through major LOE surface 116 in the same manner that light beam 724 did in the example scenario of FIG. 13. In such a case, even having only a single active facet $122_2$ may still result in a ghost image being directed toward pupil 182 of eye 180, for example, as shown by light beam 734. However, if either of facets $122_1$ and $122_3$ were active, the corresponding light beams 732 and 736 would not be directed toward pupil 182 of eye 180 and no ghost image would occur.

The position of the external light source 700 may be determined by controller 140 using light source detection system 602 (FIG. 1A) while the position of pupil 182 may be determined by controller 140 using eye tracking system 600 (FIG. 1A). Based on the known positions of external light source 700 and pupil 182, controller 140 is configured to determine which facets 122 can project the ghost images onto pupil 182. In some embodiments, controller 140 may be configured to skip activation of those facets 122 that contribute to a ghost image due to external light source 700 when generating an image. In some embodiments, controller 140 may be configured to adjust the reflectivity of those facets 122 that contribute to a ghost image due to external light source 700 where, for example, the facets 122 can be set to a reflectivity of less than 100% in order to attenuate the ghost image at a cost of having a reduced available FOV for projection of a generated image onto pupil 182.

Figure 15:
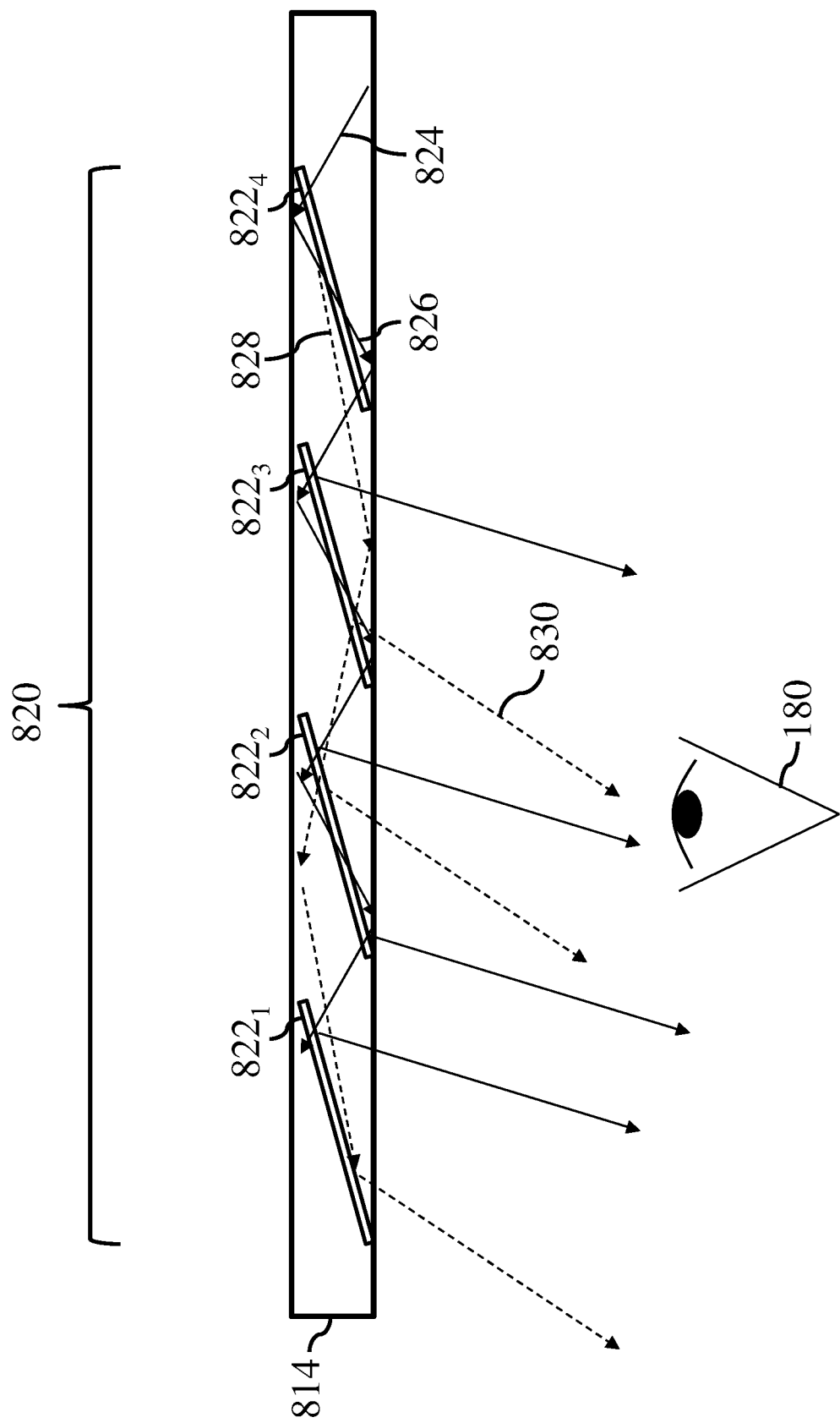
FIG. 15 is a schematic diagram of an example LOE showing light beams propagating in the LOE creating ghost images by reflections off of semi-reflective facets according to an embodiment.

With reference to FIG. 15, in an example comparative scenario, an LOE 814 receives a light beam 824 from a POD (not shown). In this example comparative scenario, LOE 804 comprises static semi-reflecting facets $822_1$, $822_2$, $822_3$ and $822_4$. As light beam 824 propagates through LOE 814, light beam 824 may be split by one or more of facets 822 into multiple portions having different angles of propagation. For example, as shown in FIG. 15, light beam 824 is split by semi-reflecting facet $822_4$ into a first portion 826, e.g., the projected image, that continues along the same propagation path as light beam 824 and a second portion 828, e.g., a ghost light beam, that has an altered propagation path and angle. In some cases, the split portions 826 and 828 of light beam 824 may cause ghost images to be projected onto eye 180 by one or more of the facets 822. For example, as seen in FIG. 15, second portion 828 is partially reflected by facet $822_3$ onto eye 180 while first portion 826 is partially reflected by facet $822_2$ onto eye 180, resulting in the projection of both the image by first portion 826 and a ghost image by second portion 828 on eye 180 at the same time.

In illustrative embodiments, the disclosed LOE 114 having selectively activatable facets 122 overcomes this issue since only the facet that will direct the light beam onto eye 180 needs to be active such that there is no opportunity for light beams to be split. In addition, because the active facet may be set to 100% reflectivity while the inactive facets may be set to 100% transmissivity the light beam received from POD 112 will be fully reflected out of LOE 114 by the active facet 122 and is not impacted by the inactive facets 122 in any meaningful way that would cause ghost images.

Figure 16A:
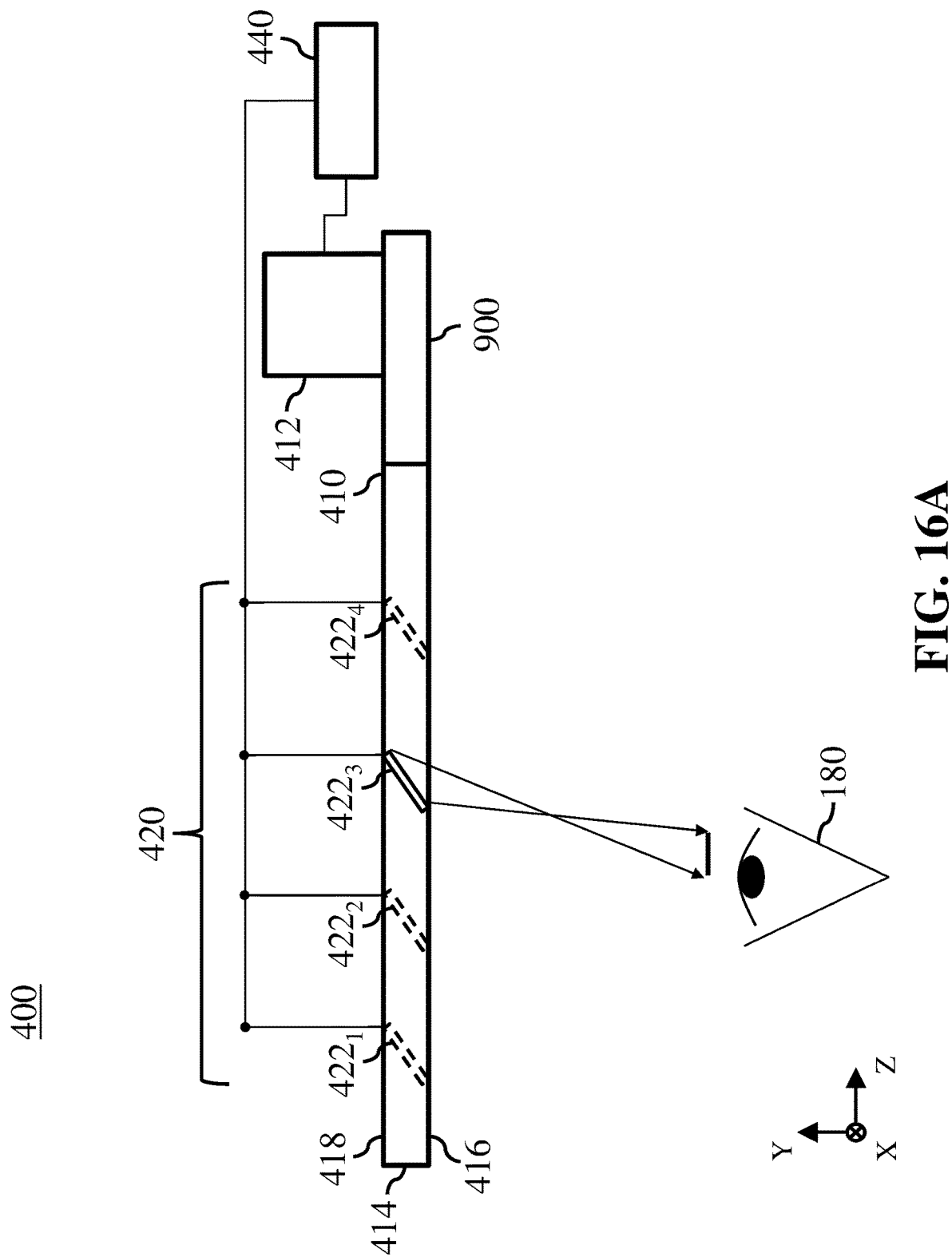
FIG. 16A is a schematic diagram of an example optical system having an additional LOE for 2D expansion according to an embodiment.
Figure 16B:
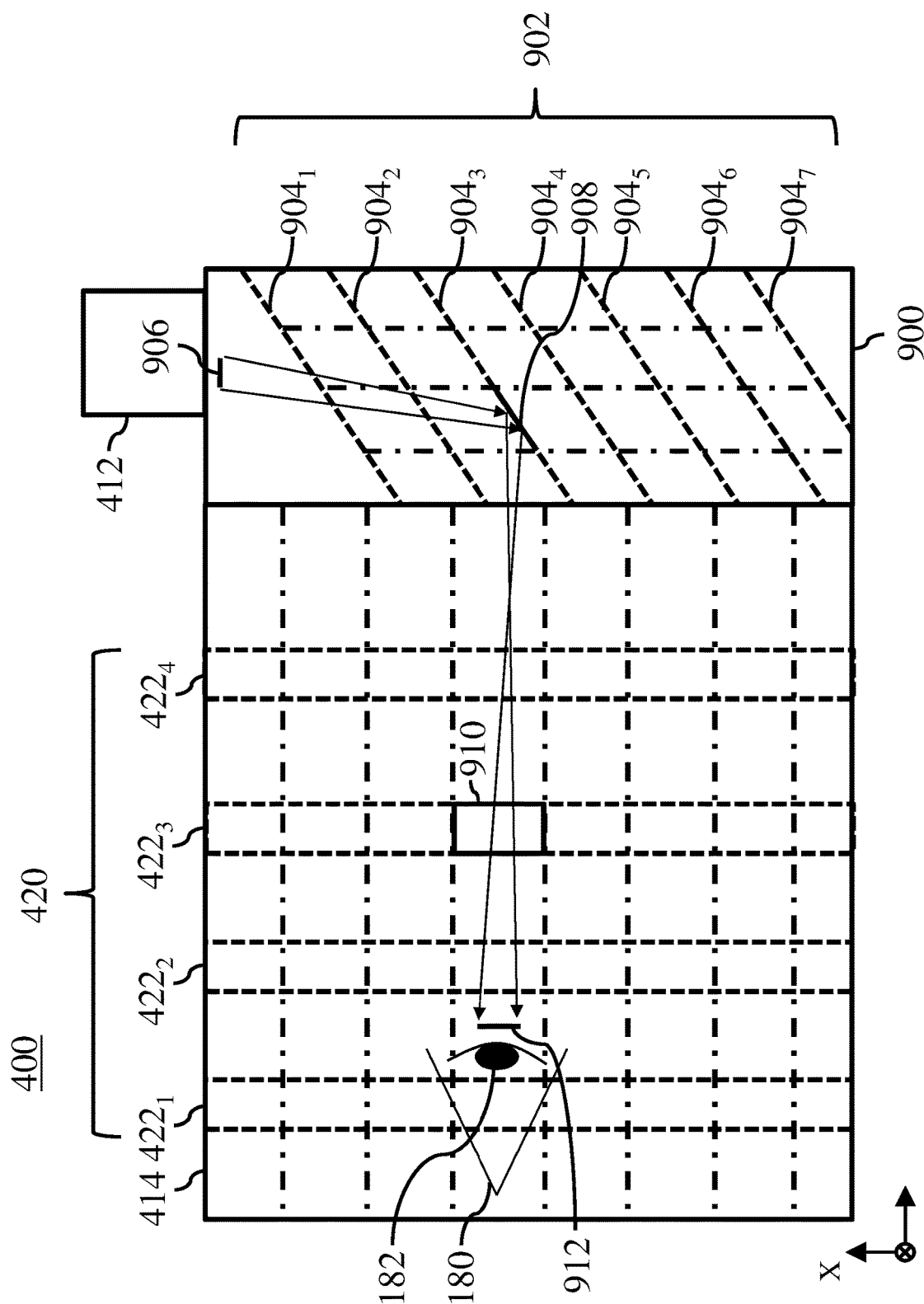
FIG. 16B is a schematic diagram of an example image projection assembly of the optical system of FIG. 16A having facets with selectively activatable segments according to an embodiment.
Figure 16C:
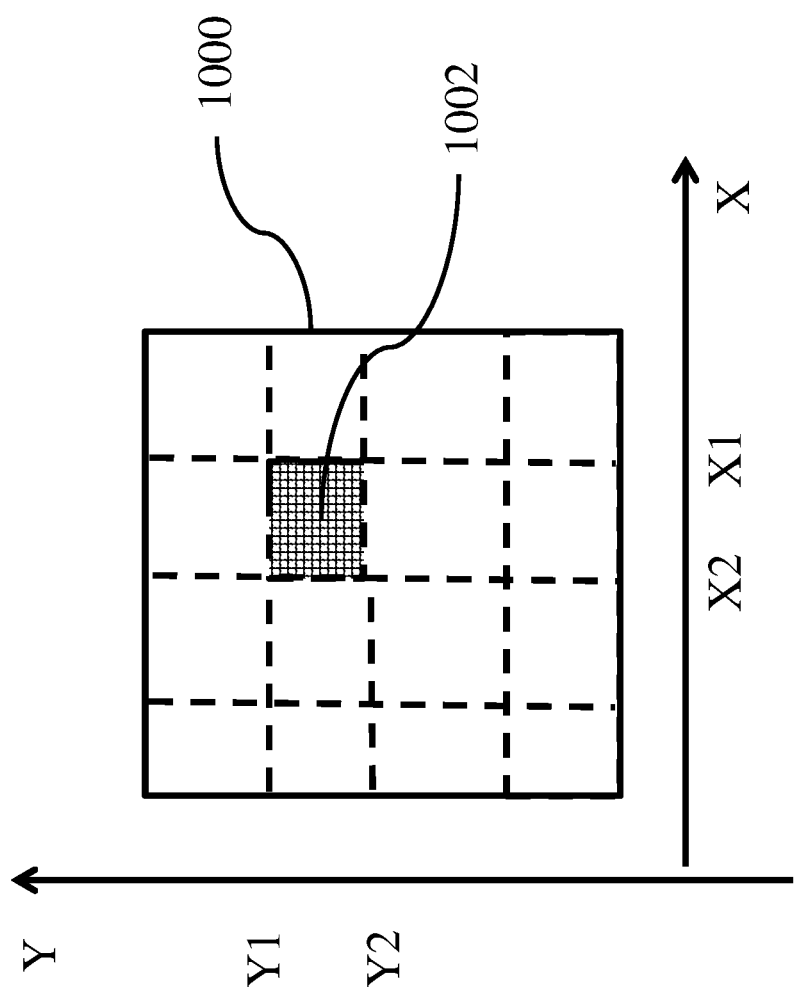
FIG. 16C is a schematic diagram of an example image generator of the optical system of FIG. 16A having selectively activatable display regions according to an embodiment.

With reference to FIGS. 16A-16C, an example embodiment of optical system 400 is described. In the embodiment of FIGS. 16A-16C, image projection assembly 410 further comprises an LOE 900 disposed between POD 412 and LOE 414.

LOE 900 comprises a coupling-out arrangement 902 comprising facets $904_1$, $904_2$, $904_3$, $904_4$, $904_5$, $904_6$ and $904_7$ which may also be collectively and individually referred to herein as facet(s) 904. While illustrated as comprising seven facets 904 in the example optical system 400 of FIG. 16A-16C, LOE 900 may alternatively comprise a larger or smaller number of facets 904 in other embodiments.

LOE 900 and facets 904 are used for 2D expansion of the LOE exit pupil. In the embodiment of FIGS. 16A-16C, facets 904 comprise selectively activatable facets that are similar to facets 122 of FIGS. 1A-4B and may be selectively activatable by controller 440 in a similar manner to that described above with reference to facets 122, e.g., to an inactive state with 100% transmissivity and 0% reflectivity, to an active state with 0% transmissivity and 100% reflectivity, or to another state having partial transmissivity and partial reflectivity. In addition, in the embodiment of FIGS. 16A-16C, facets 904 further comprise selectively activatable segments 908 such as, e.g., the active segment of facet $904_3$ indicated by the solid line, that may be separately activated or deactivated by controller 440 without activating the entire facet 904. In some embodiments, facets 422 of LOE 414 may also comprise selectively activatable segments 910 such as, e.g., the active segment of facet $422_3$ indicated by the solid line, that may be separately activated or deactivated by controller 440 without activating the entire facet 422.

As shown in FIG. 16C, POD 412 comprises an image generator 1000 that comprises display regions 1002 arranged in a grid. In some embodiments, each display region 1002 may correspond to a pixel of image generator 1000. In other embodiments, each display region 1002 may correspond to a grouping of pixels of image generator 1000. Each display region 1002 is selectively activatable by controller 440 to project an image into LOE 900 via exit aperture 906. For example, in some embodiments, one or more display regions 1002 may be activated to project an image for a particular FOV.

As seen in FIG. 16B, for a single activated facet 904 and segment 908 in LOE 900 and a single activated facet 422 and segment 910 in LOE 414, the projected FOV towards eye 180 along the X axis is defined by the location of pupil 182 and the exit aperture 906 of POD 412 in an optical system with an eye tracking system 600 (FIG. 1A).

By knowing the position of pupil 182, the angles needed to direct light beams toward the position of pupil 182 may be calculated by controller 440 in a similar manner to that described above for FIGS. 6A and 6B. The calculated angles define the display region 1002, facet 904, segment 908, facet 422 and segment 910 that need to be activated to direct a light beam from exit aperture 906 toward a portion 912 of the EMB that corresponds to the determined location of pupil 182. In this embodiment, additional calculations may be needed due to the addition of LOE 900 as compared to the calculations performed by controller 440 for the embodiment of FIGS. 6A and 6B. For example, the above mentioned distortion laws of equations (1) and (2) may be utilized or expanded to calculate the angle for each light beam from display region 1002 to exit aperture 906, from exit aperture 906 to segment 908, from segment 908 to segment 910 and from segment 910 to portion 912 of the EMB.

In an optical system that does not have an eye tracking system 600, a larger portion 186 (FIG. 7A) of the EMB may be used to calculate the light beam angles and directions in a similar manner to that described above with reference to FIGS. 7A and 7B.

Figure 17:
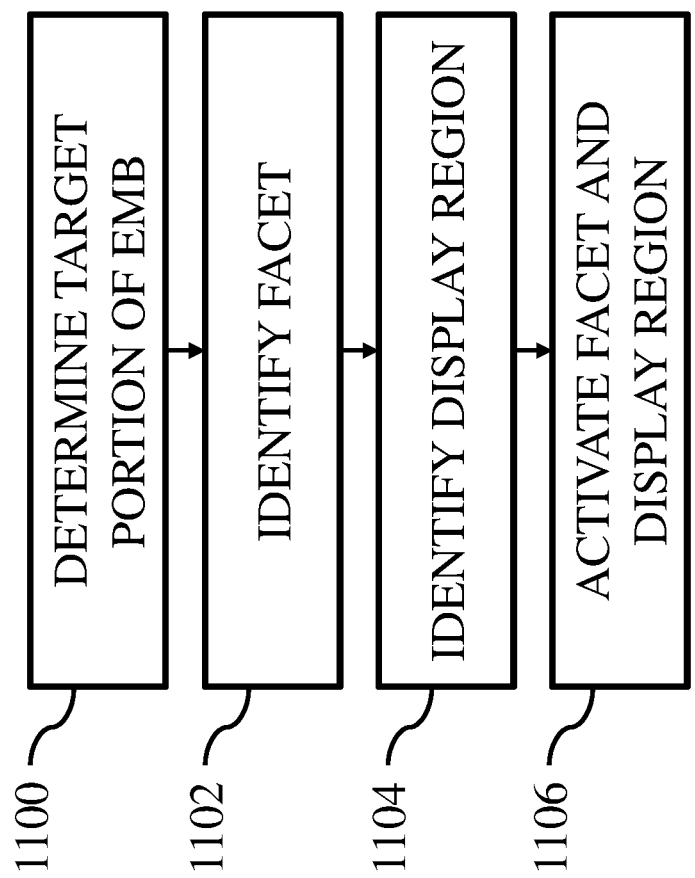
FIG. 17 is a flow diagram of an example process according to an embodiment.

With reference to FIG. 17, an example process for operating the optical system 100 comprising control of the selectively activatable facets 122 and selectively activatable display regions 202 will now be described. The process may be performed at least in part by controller 140, eye tracking system 600, POD 112 and LOE 114 or may be performed at least in part by any other portion of optical system 100.

The process of FIG. 17 comprises steps 1100 through 1106. While the process of FIG. 17 is described herein as having particular steps or a particular order of steps, the process may alternatively perform the steps in any order, may include additional steps, may include fewer steps or may only perform a portion of the steps described below in other embodiments.

At step 1100, controller 140 determines the target portion of the EMB. For example, in some embodiments, controller 140 may determine the target portion as portion 184 of the EMB using location information obtained from eye tracking system 600 as described above with reference to FIGS. 6A and 6B. In some embodiments, e.g., where eye tracking system 600 is not included or unavailable, controller 140 may determine the target portion as portion 186 of the EMB as described above with reference to FIGS. 7A and 7B.

At steps 1102 and 1104, controller 140 identifies the facet 122 of LOE 114 and the display region 202 of image generator 200 that are configured to direct a light beam comprising at least a portion of an image field of view toward the target portion of the EMB. For example, the facet 122 and corresponding display region 202 may be identified by controller 140 as described in the above embodiments. While steps 1102 and 1104 are illustrated as being performed in a particular order, any other order may be used. In addition, in some embodiments, steps 1102 and 1104 may comprise a single step.

At step 1106, controller 140 selectively activates the identified facet 122 and the identified display region 202 to direct the light beam toward the target portion of the eye motion box, for example, as shown in FIGS. 1A-4B or the other embodiments described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. An apparatus comprising:
  at least one processor configured to:
    control a light-guide optical element comprising a plurality of facets, each of the plurality of facets being selectively activatable between at least a first state having a first level of reflectivity and a second state having a second level of reflectivity higher than the first level of reflectivity, the plurality of facets being configured to direct light beams corresponding to a plurality of portions of an image field of view toward a target portion of an eye motion box when in the second state;
    control an image generator comprising a plurality of display regions, each of the plurality of display regions being selectively activatable to inject light beams corresponding to one of the plurality of portions of the image field of view into the light-guide optical element at different angles; and
    for each frame of image of a plurality of frames of images, sequentially control:
      at a first time, a first combination of a first display region of the plurality of display regions to inject a first light beam at a first angle and a first facet of the plurality of facets to be in the second state to project a first portion of an image field of view for the each frame of image toward the target portion of the eye motion box; and
      at a second time, a second combination of a second display region of the plurality of display regions to inject a second light beam at a second angle and a second facet of the plurality of facets to be in the second state to project a second portion of the image field of view for the each frame of image toward the target portion of the eye motion box.

2. The apparatus according to claim 1,
wherein the at least one processor is configured to:
  at the first time, control the second combination of the second display region of the plurality of display regions to be deactivated and the second facet to be in the first state; and
  at the second time, control the first combination of the first display region of the plurality of display regions to be deactivated and the first facet to be in the first state.

3. The apparatus according to claim 1,
wherein the first time and the second time of the each frame of image of the plurality of frames of images are selected to provide a target framerate for projecting the plurality of frames of images.

4. The apparatus according to claim 3,
wherein a period between the first time and the second time of the each frame of image of the plurality of frames of images is in milli-seconds.

5. The apparatus according to claim 1,
wherein in the first state, a controlled facet of the plurality of facets is fully transmissive and in the second state, the controlled facet of the plurality of facets is fully reflective.

6. A method comprising:
controlling a light-guide optical element comprising a plurality of facets, each of the plurality of facets being selectively activatable between at least a first state having a first level of reflectivity and a second state having a second level of reflectivity higher than the first level of reflectivity, the plurality of facets being configured to direct light beams corresponding to a plurality of portions of an image field of view toward a target portion of an eye motion box when in the second state; and
controlling an image generator comprising a plurality of display regions, each of the plurality of display regions being selectively activatable to inject light beams corresponding to one of the plurality of portions of the image field of view into the light-guide optical element at different angles, wherein controlling the light-guide optical element and the image generator comprises, for each frame of image of a plurality of frames of images, sequentially controlling:

at a first time, a first combination of a first display region of the plurality of display regions to inject a first light beam at a first angle and a first facet of the plurality of facets to be in the second state to project a first portion of an image field of view for the each frame of image toward the target portion of the eye motion box; and at a second time, a second combination of a second display region of the plurality of display regions to inject a second light beam at a second angle and a second facet of the plurality of facets to be in the second state to project a second portion of the image field of view for the each frame of image toward the target portion of the eye motion box.

7. The method according to claim 6,
wherein controlling the light-guide optical element and the image generator comprises,
at the first time, controlling the second combination of the second display region of the plurality of display regions to be deactivated and the second facet to be in the first state; and
at the second time, controlling the first combination of the first display region of the plurality of display regions to be deactivated and the first facet to be in the first state.

8. The method according to claim 6,
wherein the first time and the second time of the each frame of image of the plurality of frames of images are selected to provide a target framerate for projecting the plurality of frames of images.

9. The method according to claim 8,
wherein a period between the first time and the second time of the each frame of image of the plurality of frames of images is in milli-seconds.

10. The method according to claim 6,
wherein in the first state, a controlled facet of the plurality of facets is fully transmissive and in the second state, the controlled facet of the plurality of facets is fully reflective.

11. A system comprising:
a light-guide optical element comprising a plurality of facets, each of the plurality of facets being selectively activatable between at least a first state having a first level of reflectivity and a second state having a second level of reflectivity higher than the first level of reflectivity, the plurality of facets being configured to direct light beams corresponding to a plurality of portions of an image field of view toward a target portion of an eye motion box when in the second state;

an image generator comprising a plurality of display regions, each of the plurality of display regions being selectively activatable to inject light beams corresponding to one of the plurality of portions of the image field of view into the light-guide optical element at different angles; and at least one processor configured to, for each frame of image of a plurality of frames of images, sequentially control:

at a first time, a first combination of a first display region of the plurality of display regions to inject a first light beam at a first angle and a first facet of the plurality of facets to be in the second state to project a first portion of an image field of view for the each frame of image toward the target portion of the eye motion box; and at a second time, a second combination of a second display region of the plurality of display regions to inject a second light beam at a second angle and a second facet of the plurality of facets to be in the second state to project a second portion of the image field of view for the each frame of image toward the target portion of the eye motion box.

12. The system according to claim 11,
wherein the at least one processor is configured to:
at the first time, control the second combination of the second display region of the plurality of display regions to be deactivated and the second facet to be in the first state; and
at the second time, control the first combination of the first display region of the plurality of display regions to be deactivated and the first facet to be in the first state.

13. The system according to claim 11,
wherein the first time and the second time of the each frame of image of the plurality of frames of images are selected to provide a target framerate for projecting the plurality of frames of images.

14. The system according to claim 13,
wherein a period between the first time and the second time of the each frame of image of the plurality of frames of images is in milli-seconds.

15. The system according to claim 11,
wherein in the first state, a controlled facet of the plurality of facets is fully transmissive and in the second state, the controlled facet of the plurality of facets is fully reflective.

* * * * *